(12) United States Patent
Baryshnikov

(10) Patent No.: US 12,212,537 B2
(45) Date of Patent: Jan. 28, 2025

(54) REAL-TIME SAFE SOCIAL NETWORKING

(71) Applicant: AMI Holdings Limited, Hamilton (BM)

(72) Inventor: Daniil Baryshnikov, London (GB)

(73) Assignee: Bumble IP Holdco LLC, Wilmington, DE (US)

( * ) Notice: Subject to any disclaimer, the term of this patent is extended or adjusted under 35 U.S.C. 154(b) by 0 days.

(21) Appl. No.: 18/480,669

(22) Filed: Oct. 4, 2023

(65) Prior Publication Data

US 2024/0121209 A1 Apr. 11, 2024

Related U.S. Application Data

(60) Provisional application No. 63/414,983, filed on Oct. 11, 2022.

(51) Int. Cl.
*H04L 51/52* (2022.01)
*H04L 9/40* (2022.01)
*H04L 67/306* (2022.01)
*H04L 67/52* (2022.01)
*G06Q 50/00* (2012.01)

(52) U.S. Cl.
CPC ............ *H04L 51/52* (2022.05); *H04L 63/102* (2013.01); *H04L 67/306* (2013.01); *H04L 67/52* (2022.05); *G06Q 50/01* (2013.01)

(58) Field of Classification Search
CPC ..... H04L 51/52; H04L 63/102; H04L 67/306; H04L 67/52; G06Q 50/01
See application file for complete search history.

(56) References Cited

U.S. PATENT DOCUMENTS

| 9,918,212 | B1 * | 3/2018 | Immendorf ........... H04W 4/021 |
| 10,154,389 | B2 | 12/2018 | Shan et al. |
| 10,433,147 | B2 | 10/2019 | Keil et al. |
| 10,616,725 | B2 | 4/2020 | Cheng et al. |
| 10,638,280 | B2 | 4/2020 | Shan et al. |
| 10,721,205 | B2 | 7/2020 | Skinner et al. |
| 11,030,515 | B2 | 6/2021 | Kaufmann et al. |
| 11,303,590 | B2 | 4/2022 | Pham |

(Continued)

OTHER PUBLICATIONS

US 11,367,090 B2, 06/2022, Constantinides (withdrawn)
International Search Report and Written Opinion in International Appln. No. PCT/IB2023/060016, mailed on Dec. 14, 2023, 15 pages.

*Primary Examiner* — Oanh Duong
(74) *Attorney, Agent, or Firm* — Fish & Richardson P.C.

(57) ABSTRACT

Methods, systems, and apparatus, including computer programs encoded on computer storage media, for safe social networking environment. In some implementations, a server receives a request to activate a live sharing feature, the live sharing feature enabling access to a location and a status of a first user. The server obtains data identifying a set of trusted users for the first user. The server determines that an in-person engagement of the first user with a second user has initiated. In response to determining that the engagement has initiated, the server transmits, to each trusted user, data indicating that the first user has initiated the engagement and location data of the first user. The server obtains a status of the first user's engagement with the second user. The server provides, to each trusted user, the status of the first user's engagement and the location data of the first user.

19 Claims, 12 Drawing Sheets

(56) References Cited

U.S. PATENT DOCUMENTS

| | | | |
|---|---|---|---|
| 11,308,450 B2 | 4/2022 | Zhao et al. | |
| 11,356,393 B2 | 6/2022 | Bender et al. | |
| 11,363,407 B2 | 6/2022 | Contreras | |
| 11,720,860 B1* | 8/2023 | Benedict | G06Q 40/08 705/7.14 |
| 2008/0070593 A1 | 3/2008 | Altman et al. | |
| 2012/0246089 A1 | 9/2012 | Sikes | |
| 2014/0372290 A1 | 12/2014 | Khaef et al. | |
| 2016/0364812 A1 | 12/2016 | Cao | |
| 2021/0056270 A1 | 2/2021 | Farhan et al. | |
| 2021/0287514 A1* | 9/2021 | Chang | G08B 21/0476 |
| 2022/0035881 A1* | 2/2022 | Levy | G06Q 50/01 |
| 2022/0076173 A1 | 3/2022 | Anyaoha | |
| 2022/0132267 A1* | 4/2022 | Contreras | H04M 1/72421 |
| 2022/0398544 A1* | 12/2022 | Chung | G06Q 50/16 |
| 2023/0230045 A1* | 7/2023 | Berndtsson | G06Q 10/1095 705/7.19 |
| 2023/0230177 A1* | 7/2023 | Pazdral | G06Q 50/01 705/319 |

* cited by examiner

REAL-TIME SAFE SOCIAL NETWORKING

CROSS-REFERENCE TO RELATED APPLICATION

This application claims the benefit of U.S. Provisional Application No. 63/414,983 filed on Oct. 11, 2022, and titled "Real-Time Safe Social Networking," which is incorporated here by reference in its entirety.

TECHNICAL FIELD

This specification generally relates to networking applications, and more specifically, social networking applications deployed in computer networks.

BACKGROUND

Social networking applications enable individuals to match to other individuals with a goal of developing a personal, professional, or romantic relationship. After two individuals connect in a match, the matched individuals may communicate with one another electronically using the social networking application.

SUMMARY

The techniques described in this specification enable users in a social networking environment to match to other individuals. In some implementations, each user in the social networking environment can access a social networking application to generate a profile that characterizes that user. The profile can illustrate a name of the user, one or more photos of the user, their interests, location, and/or other characteristics that represent the user. In some implementations, a user in the social networking application can view profiles of other users. The user may be referred to as the "requesting user." In response to reviewing the profiles of other users, the requesting user can request a match with one or more other users, the one or more other users may be referred to as the "reviewing users." Additionally or alternatively, the reviewing user or users may view the profile of the requesting user and in response, decide to match with the requesting user. A selection engine, situated at a server between client devices associated with the requesting user and the reviewing user(s), can receive the request to match from one or both client devices and can facilitate network communications between these two users. In response, the two users can communicate with one another in the social network environment over the network communications.

In some implementations, the social networking application can provide enhanced safety capabilities to a user during an in-person meeting with a potential match. Specifically, the social networking application can enable the user to opt into a "live sharing" mode. The "live sharing" mode enables the social networking application to safely monitor the user during their meeting with the potential match. For example, a user can opt in or add the "live sharing" mode to their corresponding user profile on the social networking application. In response to opting in or adding the "live sharing" mode to the user's profile, the user can then decide to activate the "live sharing" mode before an in-person meeting with the potential match.

The "live sharing" mode enables the social networking application to (i) obtain status updates from the user and a real-time location of the user during their in-person meeting and (ii) notify trusted contacts of the user of the status updates and the real-time location. In this manner, the social networking application can enhance the safety of the user during their in-person meet of the potential match, e.g., by analyzing the obtained status updates of the user and their corresponding location during the in-person meet or by providing for monitoring of the user's in-person meeting by their trusted contact. Should the social networking application or a trusted contact determine the user feels unsafe during their in-person meeting, determine the user is not responding to status requests, or determine the user requests help, the social network application can notify the proper authorities or trusted contacts and provide the relevant information to aid the user.

For example, before the user initiates an in-person meeting with another person, the social networking application enables users to select one or more trusted contacts. The trusted contacts are those individuals who the user wants to notify of their status and location during the meetup with another user. In some examples, the trusted contacts may part of the social networking application or not part of the social networking application.

Prior to a user's engagement with the potential match, the social networking application can notify the trusted contacts that the user has selected the corresponding contact as a trusted contact. Then, when the user is planning to meet the potential match in-person, the user can activate the "live sharing" mode, notifying the social network application of the activation. In response, the social networking application can provide a notification to the one or more trusted contacts to indicate that (i) the user is currently meeting a potential match, (ii) one or more status updates regarding the user's in-person meetup with the potential match, and (iii) a current location of the user during the in-person meetup. The social networking can request status updates from the user during the in-person meetup on a periodic basis and notify the trusted contacts of the user's responses to the requested status updates. Similarly, the social networking application can provide the current location of the user during the in-person meetup. In this manner, the social network environment can safely monitor the user during their meeting and notify law enforcement or trusted contacts should the meeting go astray.

In one general aspect, a method performed by a computing system includes: receiving, by a server and from a client device associated with a first user, a request to activate a live sharing feature associated with the first user, the live sharing feature enabling access to a location and a status of the first user of a social networking application; obtaining, by the server and from the client device, data identifying a set of one or more trusted users to be designated as trusted contacts for the first user; determining, by the server, that an in-person engagement of the first user with a second user associated with the social networking application has initiated; in response to determining that the in-person engagement of the first user with the second user has initiated, transmitting, by the server and to a client device of each trusted user of the set of trusted users, (i) data indicating that the first user has initiated the in-person engagement with the second user and (ii) location data of the first user; obtaining, by the server and from the client device of the first user, data indicating a status of the first user's in-person engagement with the second user during a time period of the in-person engagement; and providing, by the server and to the client device of each trusted user of the set of trusted users, (i) the obtained data indicating the status of the first user's in-person engagement with the second user during the time period of the in-person engagement and (ii) the location data of the first user.

Other embodiments of these and other aspects of the disclosure include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue having instructions that, when executed by data processing apparatus, cause the apparatus to perform the actions.

The foregoing and other embodiments can each optionally include one or more of the following features, alone or in combination. For example, one embodiment includes all the following features in combination.

In some implementations, receiving the request to activate the live sharing feature associated with the first user includes: receiving, by the server and from the client device, the request to activate the live sharing feature, the request including data indicating the first user, data indicating a user profile of the first user, and data indicating the first user has requested to activate the living sharing feature; retrieving, by the server, the user profile of the first user from a plurality of user profiles associated with the social networking application; and storing, by the server and in the retrieved user profile associated with the first user, the data indicating the first user requested to activate the live sharing feature.

In some implementations, obtaining the data identifying the set of trusted users to be designated as the trusted contacts for the first user includes: providing, by the server and to the client device, data indicating one or more users for the first user to designate as trusted contacts for the first user; and receiving, by the server and from the client device, data indicating a selection of a subset of trusted users of the one or more users to be designated as a trusted contact for the first user.

In some implementations, providing the data indicating the one or more users for the first user to designate as the trusted contacts while using the social networking application further includes providing, by the server and to the client device, data for the client device to provide contact information from a list of contacts in a user interface to the first user for review, the user interface enabling the first user to select the subset of trusted users from users listed in the list of contacts.

In some implementations, in response to receiving the data indicating the selection of the set of trusted users as the trusted contact for the first user further, the method includes: retrieving, by the server, a user profile of the first user from a plurality of user profiles associated with the social networking application; and storing, by the server and in the retrieved user profile associated with the first user, the data indicating the selection of the set of trusted users to be designated as the trusted contact for the first user, wherein the data includes (i) an indication of each trusted user and (ii) contact information for each of the trusted users.

In some implementations, the method further includes: for each trusted user of the set of trusted users: transmitting, by the server and to a client device of the trusted user, a request to determine whether the user designated as a trusted user desires to be a trusted user; receiving, by the server and from the client device of the trusted user, a response that indicates whether the user designated as the trusted user desires to be the trusted user, the response including at least one of an opt-in and an opt-out; and storing, by the server and in the user profile of the first user, the response that indicates whether the user designed as the trusted user desires to be the trusted user.

In some implementations, prior to determining that the in-person engagement of the first user with the second user on the social networking application has initiated, the method includes: receiving, by the server and from the client device associated with the first user, data indicating that the first user desires to connect with the second user on the social networking application; identifying, by the server, contact information for a second client device on the social networking application, the second client device being associated with the second user; transmitting, by the server and to the second client device of the second user, the data indicating that the first user desires to connect with the second user on the social networking application; receiving, by the server and from the second client device, data indicating the second user accepts the first user's request to connect with the second user; and enabling, by the server, a communication channel on the social networking application between the first user and the second user.

In some implementations, determining that the in-person engagement of the first user with the second user associated with the social networking application has initiated, the method includes: receiving, by the server and from the client device of the first user, data indicating that the first user and the second user plan to be within a threshold geographic distance of one another for the engagement; receiving, by the server and from the client device of the first user, data indicating that the first user desires to share their location with each trusted user of the set of trusted users; determining, by the server, a first location of the client device associated with the first user and a second location of a second client device associated with the second user; determining, by the server, a distance between the first location and the second location; and in response to determining the distance satisfies the threshold geographic distance, determining, by the server, the engagement of the first user with the second user associated with the social networking application has initiated.

In some implementations, transmitting (i) the data indicating that the first user has initiated the in-person engagement with the second user and (ii) the location data of the first user further includes: obtaining, by the server, contact information for each of the trusted users from a user profile of the first user; obtaining, by the server and in a periodic manner, location data of the client device of the first user; and transmitting, by the server and to each client device of the trusted users, (i) the data indicating that the first user has initiated the in-person engagement with the second user and (ii) the location data of the first user, using the obtained contacted information for each of the trusted users.

In some implementations, obtaining the data indicating the status of the first user's in-person engagement with the second user during the time period of the in-person engagement further includes: while the time period of the in-person engagement has not elapsed: determining, by the server, an amount of time has elapsed during the time period of the in-person engagement, wherein the amount of time is less than the time period of the in-person engagement; transmitting, by the server and to the client device of the first user, user interface data, the user interface data presenting a user interface that requests the first user to provide a status indicative of (i) a pleasant engagement with the second user or (ii) an unpleasant engagement with the second user; and restarting, by the server, a countdown of the amount of time.

In some implementations, providing (i) the obtained updates during the time period of the in-person engagement and (ii) the location data of the first user further includes: while the time period of the in-person engagement has not elapsed: receiving, by the server and from the client device of the first user, the status indicative of (i) the pleasant engagement with the second user or (ii) the unpleasant engagement with the second user; and transmitting, by the server and to the client device of each trusted user of the set of trusted users, the status indicative of (i) the pleasant engagement with the second user or (ii) the unpleasant engagement with the second user and (iii) the location data of the user.

In some implementations, providing (i) the obtained updates during the time period of the in-person engagement and (ii) the location data of the first user further includes: generating, by the server, a user interface that displays a history of: (i) the status indicative of the pleasant engagement or the unpleasant engagement during the time period of the in-person engagement, (ii) the location data of the first user during the time period of the in-person engagement, and (iii) a map on the user interface illustrating the location data of the first user during the time period of the in-person engagement; and transmitting, by the server and to the client device of each trusted user of the set of trusted users, the user interface.

In some implementations, providing (i) the obtained updates during the time period of the in-person engagement and (ii) the location data of the first user further includes: while the time period of the in-person engagement has not elapsed: receiving, by the server and from the client device of the first user, a status indicating (i) the first user requests to stop sharing and (ii) an indication that the in-person engagement is still continuing and the first user feels safe; and transmitting, by the server and to the client device of each trusted user of the set of trusted users, the status indicating that the first user has requested to stop sharing their location and status updates of the in-person engagement.

In some implementations, transmitting (i) the data indicating that the first user has initiated the in-person engagement with the second user and (ii) the location data of the first user further includes providing, by the server and to the client device of each trusted user of the set of trusted users, a group chat communication session enabling each trusted user to communicate while the time period of the in-person engagement has not elapsed.

In some implementations, obtaining the data indicating the status of the first user's in-person engagement with the second user during the time period of the in-person engagement further includes: obtaining, by the server and from the client device, a request indicating that the first user requests for emergency services; in response to obtaining the request indicating that the first user requests for the emergency services, transmitting, by the server, instructions to the first client device causing the first client device to record at least one of audio and video data; and transmitting, by the server and to the emergency services, data indicating the first user requests for the emergency services.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements. The components shown here, their connections and relationships, and their functions, are meant to be examples only, and are not meant to limit the implementations described and/or claimed in this document.

DETAILED DESCRIPTION

Figure 1:
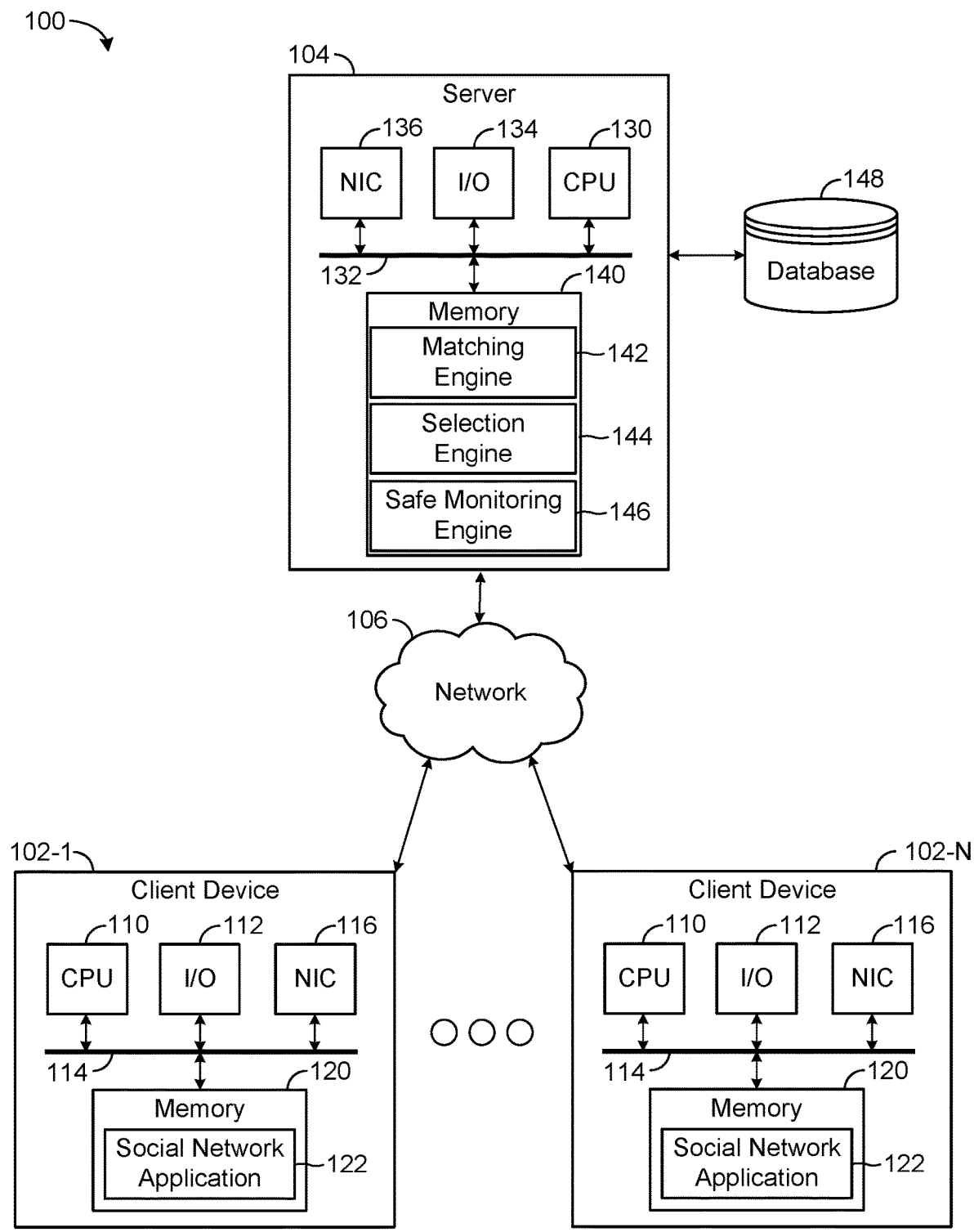
FIG. 1 is a block diagram that illustrates an example of a system in a social networking environment.

FIG. 1 is a block diagram that illustrates an example of a system in a social networking environment. In some implementations, the system 100 can include a plurality of client devices 102-1 through 102-N in communication with a server 104 via a network 106. The network 106 can include a wired, wireless network, or any combination thereof. For example, the network 106 can include a connection over the Internet, a Wi-Fi connection, a Bluetooth connection, or some other local or extranet connection.

Each of the client devices 102-1 through 102-N (hereinafter referred to as "client devices 102") can include one or more processors, e.g., a central processing unit, 110 in communication with input/output devices 112 via a communication bus 114. The input/output devices 112 can include, for example, a touch display, a keyboard, a mouse, a combination of the above, or another means to interact with the client devices 102. The network interface circuit (NIC) 116 can connect to the communication bus 114 to provide wired and/or wireless connectivity to the network 106. A memory or other storage medium 120 is also connected to the communication bus 114. The memory 120 for each client device stores instructions executed by the processor 110. In particular, the memory 120 stores instructions for a social network application 122, such as a social dating application, which communicates with the server 104 for coordinating introductions between users that have been identified as potential matches, e.g., potential friends, dating partners, business partners, etc.

In some implementations, each client device 102 can be a mobile device. The client devices 102 can be, for example, a smart phone, a laptop, a tablet, a personal computer, a handheld device, a wearable device, or some other device. The client devices 102 can execute the social network application 122 stored in memory 120. Different users that subscribe to the same social network application can operate different client devices.

In some implementations, the server 104 can include one or more components for executing the social network application. For example, the server 104 can include one or more processors 130, a communication bus 132, input/output devices 134, a network interface card (NIC) 136, and memory 140, among other components. The memory 140 can connect to the communication bus 132. Additionally, the memory 140 can store a matching engine 142, a selection engine 144, and a safe monitoring engine 146. Each of the matching engine 142, the selection engine 144, and the safe monitoring engine 146 include instructions to be executed by the processor 130 to implement the processes and functions with respect to the disclosure and FIGS. 2-4H discussed below.

In some implementations, the system 100 includes a database 148 in communication with the server 104. The database 148 can include, for example, one or more data storage components for storing information associated with the social network application 122. Additionally, the database 148 can store information associated with the matching engine 142, the selection engine 144, and the safe monitoring engine 146. For example, the database 148 can store information that describes each of the client devices 102, the user profiles associated with the client devices, historical matching information between user profiles, messaging information detailing messages between matched users, data detailing a lost/found function, and other information.

Figure 2:
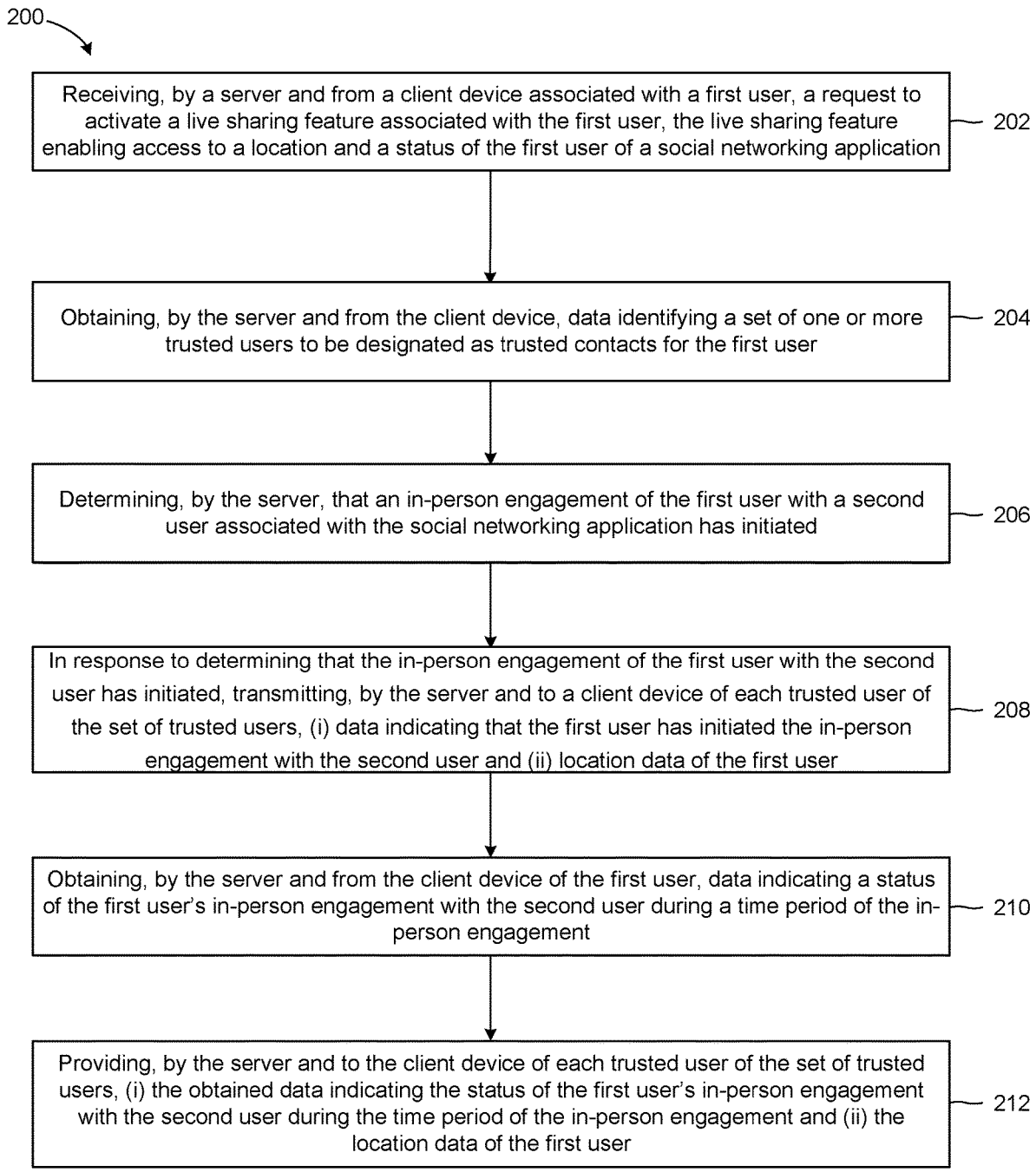
FIG. 2 is a flow diagram that illustrates an example of a process for safe monitoring in a social networking environment.

FIG. 2 is a flow diagram that illustrates an example of a process 200 for safe monitoring in a social networking environment. In some implementations, the server 104 from the system 100 of FIG. 1 can perform the process 200, for example.

The system can receive, from a client device associated with a first user, a request to activate a live sharing feature associated with the first user, the live sharing feature enabling access to a location and a status of the first user of a social networking application (202).

The system can obtain, from the client device, data identifying a set of one or more trusted users to be designated as trusted contacts for the first user (204).

The system can determine that an in-person engagement of the first user with a second user associated with the social networking application has initiated (206).

In response to determining that the in-person engagement of the first user with the second user has initiated, transmitting, to a client device of each trusted user of the first set of trusted users, (i) data indicating that the first user has initiated the in-person engagement with the second user and (ii) location data of the first user (208).

The server can obtain, from the client device of the first user, data indicating a status of the first user's in-person engagement with the second user during a time period of the in-person engagement (210).

The server can provide, to the client device of each trusted user of the set of trusted users, (i) the obtained data indicating the status of the first user's in-person engagement with the second user during the time period of the in-person engagement and (ii) the location data of the first user (212).

Figure 3A:
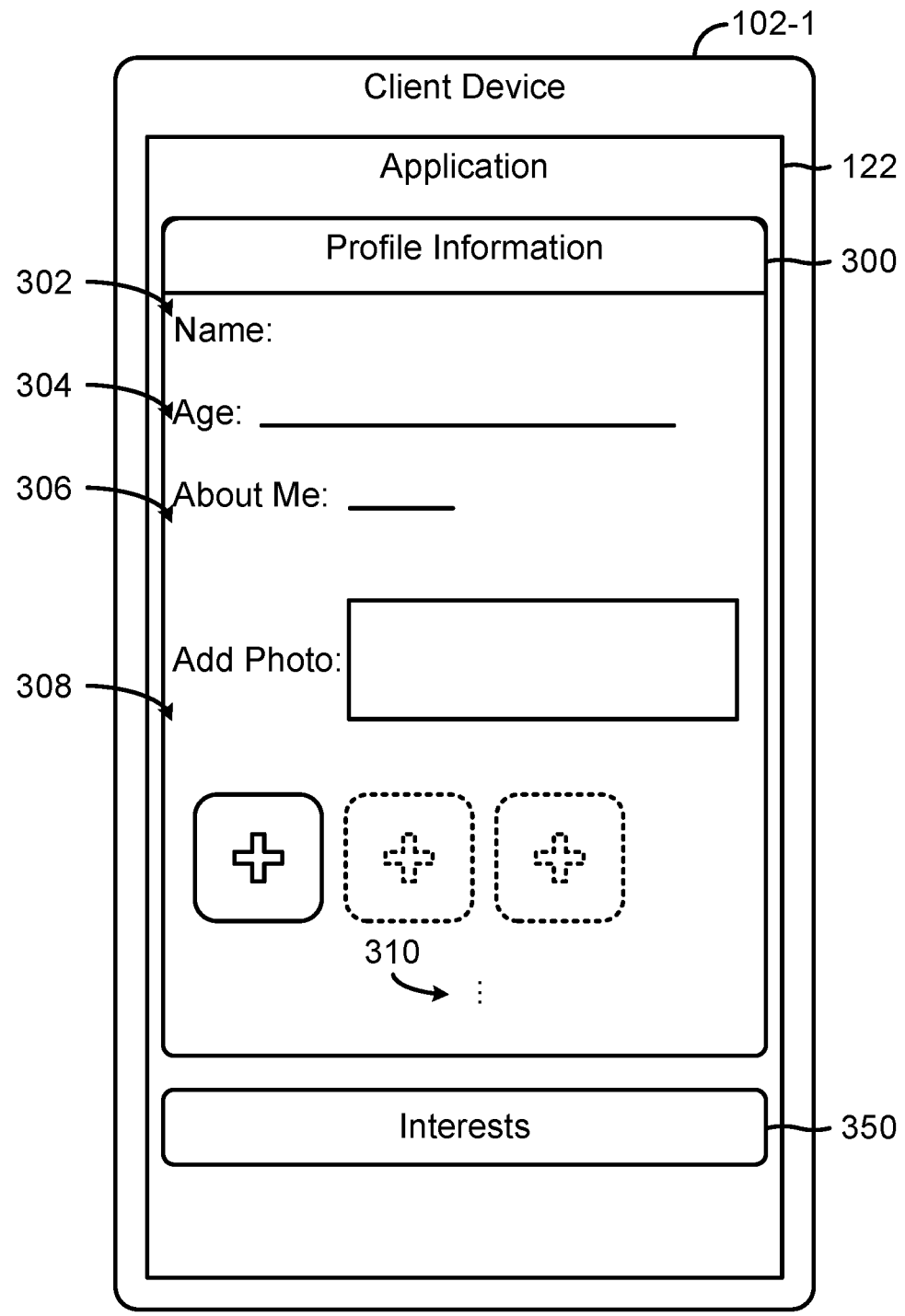
FIG. 3A is a block diagram that illustrates an example of a user interface for generating a profile.

FIG. 3A is a block diagram that illustrates an example of a user interface 300 for generating a profile. The user interface 300 is presented to a user seeking to use the social networking application. Before interacting with others via the social networking application, the user can create a personal profile for participation in the social networking application. As illustrated on the user interface 300, the user can interact with the social networking application 122 of client device 102-1 to provide user profile information. The profile information can include, for example, the name 302 of the user, an age 304, biographical text 306, one or more photographs 308, and/or a variety of other fields 310. The other fields 310 can include, for example, city, links to social media profiles on other networks, religious beliefs, orientation, and other personal information about the user. Moreover, on the user interface 300, each user can specify their interests 350 by interacting with the button for the interests 350.

The user can provide his/her information for the personal profile by speaking into the client device 102-1, typing on a touch screen of the client device 102-1, or typing using a keyboard and mouse. In some implementations, the user can update his/her personal profile while using the social networking application. The personal profile can be updated and the changes can be reflected for other users to see at any time.

Figure 3B:
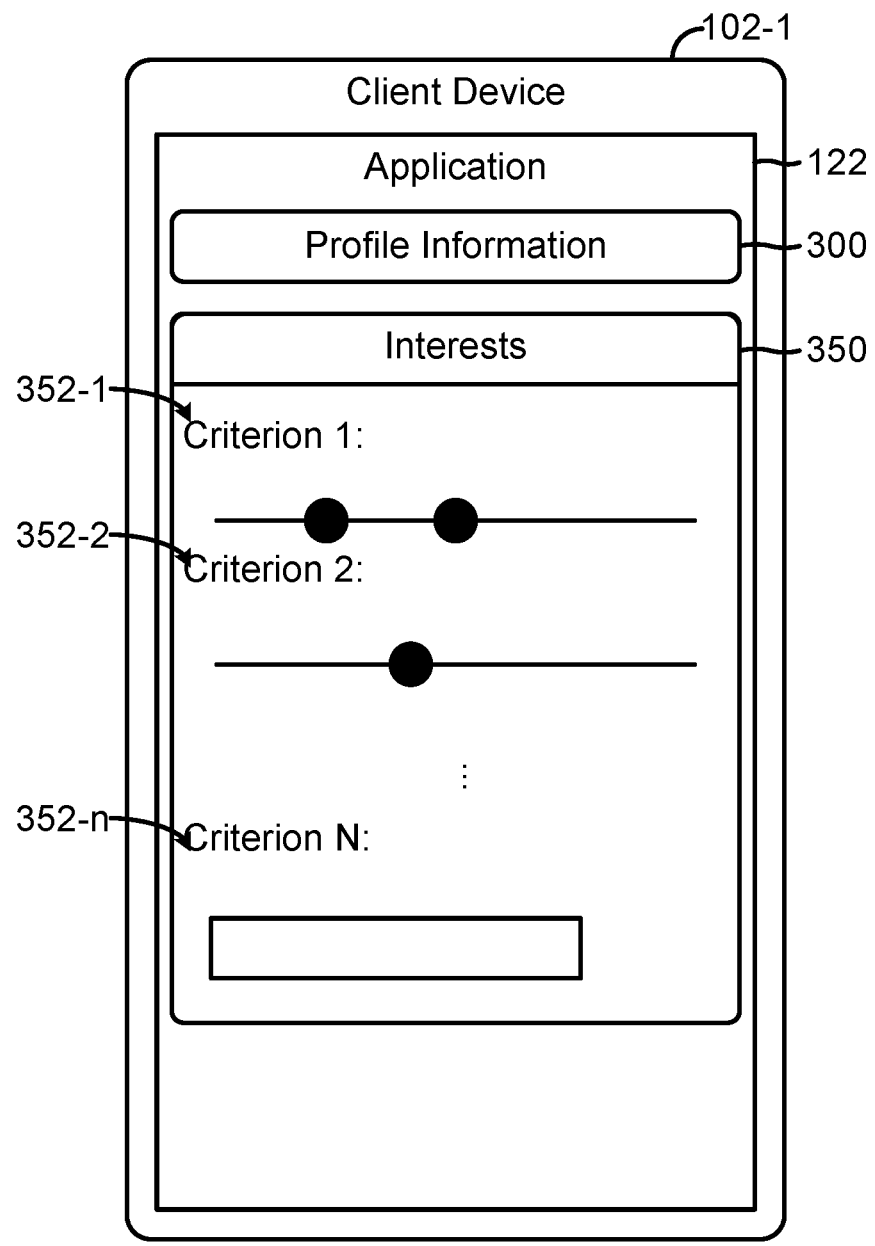
FIG. 3B is another block diagram that illustrates an example of user interface for generating a profile.

FIG. 3B is another block diagram that illustrates an example of user interface for generating a profile. FIG. 3B illustrates a different user interface of the social networking application 122 on the client device 102-1. For example, the client device 102-1 can illustrate a button for the user interface 300 from FIG. 3A and the user interface for the interests 350 showing the interests of the user. The user can transition from user interface 300 for the user profile to the user interface for the interests 350 by selecting the button for the interests 350 shown in FIG. 3A. Additionally, the user can transition from the user interface for interests 350 to the user interface 300 for the profile by selecting the button for the user interface 300 for the user profile information shown in FIG. 3B.

In some implementations, the user can specify their characteristics or criteria to help improve the matchmaking of the social networking application. For example, as shown in FIG. 3B, a user can specify their interests 350 by interacting with a user interface to provide various criteria 352-1 through 352-N that the user is looking for in a match. These criteria can include, for example, an age of a potential match, a distance the potential match is from the user, hobbies, commitment disposition, orientation, or a combination of the above factors.

In some implementations, the matching engine 142 of system 100 can identify one or more of the criteria 352-1 through 352-N instead of or in addition to those specified by the user based on, for example, analysis of the user's interactions with the system 100. The system 100, and more specifically the matching engine 142, can use the interests 350 designated by each user profile to generate matching criteria for use in identifying potential matches for the user. Additionally, the matching engine 142 can take into account requests provided by the user for one or more potential matches.

Once a user profile has been completed, a user can begin to view the profiles of other users, while the user's own profile is circulated among various other users in the social networking application. In some implementations, a user can receive a variety of profiles of other users who have been identified as potential matches based on their interests 350, e.g., identified criterion 352-1 through 352-N. The matching engine 142 can provide the variety of profiles of other users to the client device 102-1 of the user based on deriving matching criteria from the interests 350 to criteria from the interests of other users. Based on the matching criteria between users, the matching engine 142 can identify potential or recommended matches between users.

In response to the matching engine 142 identifying potential or recommended matches, the matching engine 142 can then provide the profiles of the potential matches to the user for review. Similarly, the matching engine 142 can perform the match identification and providing of profiles to other users, e.g., users of client devices 102-2 through 102-N in addition to the user of client device 102-1.

Generally, the matching engine 142 can determine one or more potential or recommended matches between users through a variety of processes. For example, the matching engine 142 can use filters, applied rules, trained machine learning algorithms, or some combination of these, among others, to identify potential or recommended matches for a particular user. For example, the matching engine 142 can generate one or more filters or rules based on the interests, e.g., interests 350, of a user, and can apply the filters or rules to users' profile information for other users to identify a pool of applicants to provide as potential matches for the user. In another example, the matching engine 142 can include a machine-learning model, e.g., a neural network model, which has been trained to identify features from the profile and interests of a particular user. The machine-learning model can process profile information for other users to identify potential matches for the user. For example, the machine-learning model can receive criterion and interests of user A and criterion and interests of user B and output a likelihood of a match between user A and B. If the matching engine 142 determines the likelihood of a match, e.g., a percentage or statistic, is greater than the threshold value, then the matching engine 142 can provide the profile of user B to the client device of user A and provide the profile of user A to the client device of user B as a recommended or potential match.

Figure 4A:
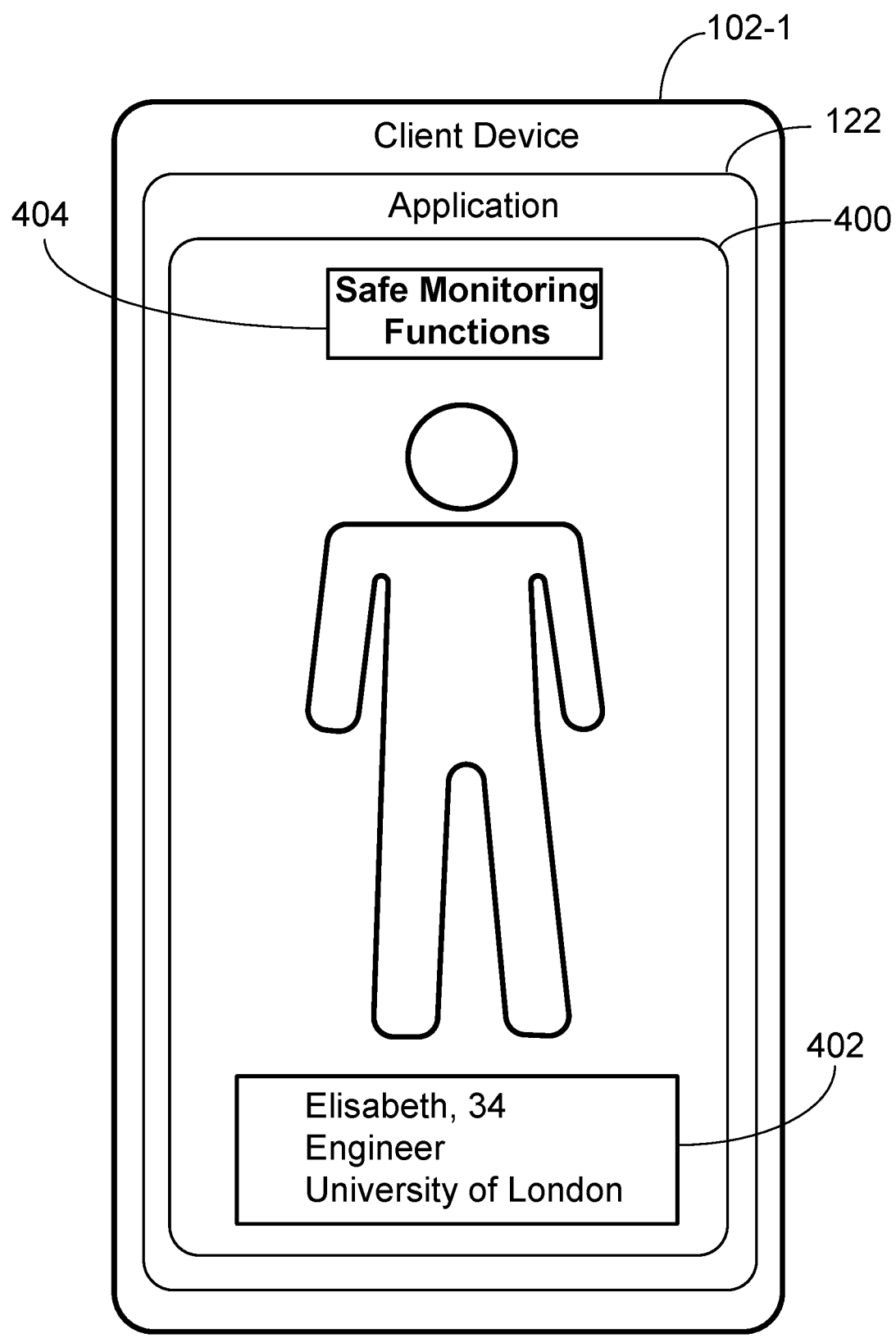
FIG. 4A is a block diagram that illustrates an example of a user interface for interacting in a social networking environment.

FIG. 4A is a block diagram that illustrates an example of a user interface 400 for interacting in the social networking environment. After the matching engine 142 has identified one or more potential matches for a user, the matching engine 142 can provide the profiles of the potential matches to the user for review. The user is then able to explore the provided match on his/her client device 102-1 in the social networking application 122. For example, as illustrated in FIG. 4, the social networking application 122 executing on the client device 102-1 can display a user interface 400 that allows the user to view and explore the information that has been added to a potential match's user profile. The user interface 400 can also include a prompt 402 that describes information about the user associated with the displayed user profile. The user interface 400 can also include safe monitoring functions 404, which will be further described below.

To ascertain a mutual agreement to connect two users together, each profile can be voted on by the viewing user. For example, after reviewing the personal profile of another user, the viewing user can vote "yes" indicating they would like to connect with that specific user, or vote "no" indicating they are not interested in connecting with that specific user.

In some implementations, the viewing user can vote "yes" by interacting with the display of the client device. For example, the user can click and drag the personal profile of another user by swiping the profile off the screen of the client device 102-1 in a particular direction, e.g., right, left, up, down, or other. In some implementations, the viewing user can vote "no" by interacting with the display of the client device. For example, the user can click and drag the personal profile of another user by swiping the profile off the screen of the client device 102-1 in an opposite direction from the particular direction to vote "yes." If the user swipes right for a vote "yes" on the display, then the user can swipe left for a vote "no" on the display. In some implementations, if the user has voted "yes" for a profile of another user, the matching engine 142 can place the profile of the user into the queue of profiles to be viewed by the other user, e.g., the user voted as "yes." Through this mechanism, the matching engine 142 is able to accelerate the pace with which two users view each other's profiles than would typically occur in a purely organic system of profile selection.

When two users both mutually vote "yes" upon the viewing of the other user's profile, a connection, e.g., a match, is established between the two users. Once a match is established, the matching engine 142 can supply a notification of the match to both of the matched users with a prompt to contact the other matched user. On the other hand, when one votes "yes" but the other user votes "no," no further connection is established between the two users, and their profiles are not shown to each other again, e.g., or they may be shown again depending on changes with their profile, criterion, search parameters, or due to a time elapsing. In this manner, the matching engine 142 allows the intention of each user within the social network to be communicated.

In some implementations, the two matched users are directed to a messaging system of the social network to contact the other matched user. Once users are within the messaging system, a communication engine of the server 104 can manage the messages sent back and forth between the two users. In some implementations, the communication engine can display elements of user's profile in order to increase recognition of the other user. The elements can include, for example, name, age, and photographs. Additionally, the communication engine can enable the matched users to speak in an auditory manner. In some implementations, the communication engine can convert the audio to one or more audible annotations to provide to both client devices.

In some implementations, the user interface 400 includes safe monitoring functions 404 to enable the user of client device 102-1 to be safely monitored during a meeting with a potential match. The user can interact with the safe monitoring functions 404 prior to an in-person meeting with a matched individual to activate a "live sharing" mode. The activation of the "live sharing" mode enables subsequent sharing of data to trusted contacts of the user. The data can include, for example, (i) the user's status of during the in-person meeting with the matched individual and (ii) a location of the user during a time period of the in-person meetup. In this manner, the social networking application enables users to feel safe and monitored during their in-person meetup with matched individuals, as will be further described below.

In some implementations, the safe monitoring functions 404 can be utilized in other environments. Specifically, the safe monitoring functions 404 can be applied in environments to users who have not matched on the social networking application 122. Rather, the safe monitoring functions 404 can be utilized as a general safety feature for a user of the social networking application each time they meet an individual in the real world. For example, a user may go on a date, a job interview, a hike, a team meetup, a vacation, or another in-person or virtual event, and the user can activate the safety monitoring functions 404 when the event starts without having to match with another individual on the social networking application 122. The user may decide to meet one or more people through connections made outside the social networking application 122 and instantiate the safe monitoring functions 404 in response to starting the meeting of with these people. The social networking application 122 can notify trusted contacts of the user that the user is starting the meeting and provide notifications to the trusted contacts that indicate how well the meeting is going throughout the duration of the meeting. Other examples are also possible.

Figure 4B:
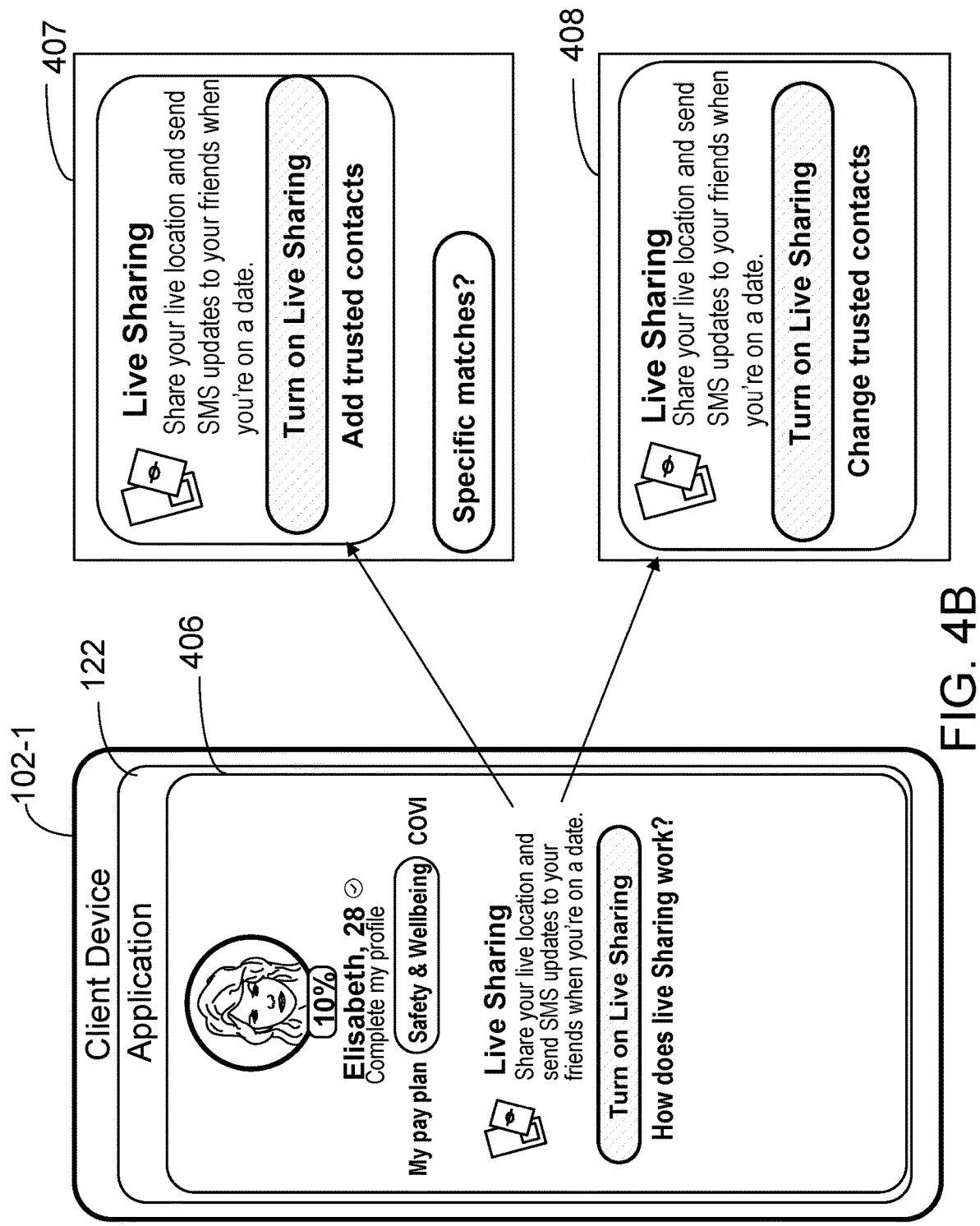
FIGS. 4B-4H are block diagrams that illustrate examples of user interfaces during safe monitoring of a social networking environment.

FIG. 4B is a block diagram that illustrates an example of user interfaces during safe monitoring of a social networking environment. In some implementations, a user associated with client device 102-1 may desire to add a "live sharing" mode to their profile on the social networking application 122. Specifically, the user associated with client device 102-1, e.g., in this case, Elisabeth, aged 28, can interact with the safe monitoring functions 404 element from the user interface 400. In response to interacting with the safe monitoring functions 404 element on the user interface 400, the social networking application 122 transitions the user interface 400 from FIG. 4A to user interface 406 shown in FIG. 4B.

The user interface 406 illustrated in FIG. 4B illustrates a user profile for the user Elisabeth. The user profile shown on the user interface 406 enables the user to provide user profile information, similar to the information provided with respect to user interface 300. Additionally, the user Elisabeth can interact with specific tabs on the user interface 406. In this example, Elisabeth can interact with the specific tabs by selecting each of the tabs with her finger or a stylus, and provide information related to each of the tabs to complete her overall profile.

The tabs on the user interface 406 can include, for example, "My pay plan", "Safety & Wellbeing," "COVID Status," and "Other Profile Information." The "My pay plan" tab enables the user to provide financial details related to financial payments included within the social networking application. The "Safety & Wellbeing tab" enables the user to activate/deactivate a "live sharing" mode and provide other information related to the "live sharing" mode. The "Other Profile Information" can include information related to data provided using the user interface 300 and information related to prior match history of Elisabeth, for example. The tabs on the user interface 406 can also include additional information related to the user profile.

In some implementations, the user can opt-into or opt out of a "live sharing" mode in the user interface 406 of the social networking application 122. The social networking application 122 enables a user to indicate in their corresponding user profile whether they desire to turn on or turn off live sharing in their user profile. The user can also interact with a button that includes the text "How does live Sharing work?" In response to interacting with the button, e.g., speaking, tapping, directing with keyboard, etc., the user interface 406 can provide a description related to live sharing. The description can read, for example, "Share your live location and send SMS updates to your friends when you're on a date." The description can also include other text, graphical elements, video, or audio descriptions related to the functionality of live sharing.

Generally, the live sharing features enable the social networking application 122 to monitor and track an individual during their in-person meetup with a matched individual. Moreover, the social networking application 122 can periodically transmit status requests to the individual during their in-person meetup with the matched individual. The status requests can (i) ask how the meetup is going, (ii) request the individual provide a status regarding whether the individual feels safe, (iii) request the individual provide a status regarding whether the individual needs assistance, or (iv) request the individual provide a message they would like the social networking application 122 to pass along to one or more trusted contacts, etc. The social networking application 122 can request for other status updates, as will be further described.

In some implementations, the live sharing features provide an enhanced safety capability to the users who utilize the social networking application. In typical systems, a first user may connect or match with a second user using an application on their respective client devices. The first and second users may communicate through the application on their respective client devices through texting, voice messages, audio messages, video messages, or some combination of the above or another form of messages. During this time, the first and second users may desire to meet in person. However, once the first and second users desires to meet in person, the application that enabled the first and second user to communicate lacks the ability to monitor the in-person meetup between the first and second user. This may be disadvantageous in the case where the in-person meetup proceeds unfavorably.

The techniques described here enable social networking application 122 to monitor and track the in-person meetup between the first and second person, in the chance that either of the first or second user feels unsafe during the in-person meetup. Moreover, the safety monitoring features enables each user to designate one or more trusted contacts to the social networking application 122. The one or more trusted contacts for each user are other individuals, who may or may not use the social networking application 122, the user deems as safe and trusted individuals. Thus, not only does the social networking application 122 monitor the in-person meetup between the first and second person, the social networking application 122 can further provide status updates to each of the trusted contacts for each corresponding person during the meetup.

In this manner, the social networking application 122 can provide an environment for safe and secure in-person meetup outside the confines of respective clients' devices. Specifically, the social networking application 122 can request status updates from each person during the in-person meetup to determine how that person is feeling during the meeting. Each person can provide a multitude of responses that include, for example, safe, unsafe, happy, nervous, not great, great, amazing, need help, and no longer need to provide status updates, to name a few examples. Moreover, the social networking application 122 on each client device can provide real-time location information from each individual. Thus, the social networking application 122 can offer significant advantages for a safe and secure environment during an in-person meetup. First, the social networking application 122 offers a secure environment to their users. Matched users who decide to meetup in-person can feel safe in knowing their trusted contacts are monitoring their presence and can take action to notify the proper authorities, e.g., law enforcement or other, should the in-person meetup go astray. Second, the social networking application 122 can also enable users to deactivate the live sharing mode when an in-person meetup is over or when a user enables the in-person meetup is going well and live sharing is no longer required. Thus, the activation and deactivation of the live sharing mode offers user's flexibility in whether they desire to be monitored and to request for aid should they deem aid necessary.

Continuing with the example, of FIG. 4B, the user Elisabeth can Turn on Live Sharing and continue to select one or more trusted contacts for their respective profile. In some implementations, the user, i.e., Elisabeth, can add one or more trusted contacts to their profile. As illustrated in user interface 407, Elisabeth can select the buttons "Turn on Live Sharing," "Add trusted contacts," and "Specific matches?" In some implementations, Elisabeth can interact with each one of the buttons through various manners. When selecting the "Add trusted contacts" button, Elisabeth can select one or more contacts to designate as trusted contacts for when Elisabeth decides to meet a matched individual during an in-person meetup.

In some implementations, the user can designate one or more trusted contacts for specific matches by interacting with the "Specific matches?" button. For example, Elisabeth can tap on the "Specific matches?" button and designate one or more trusted contacts for each of her currents matches. In this example, Elisabeth may be currently matched to a first user named John, a second user named Mark, and a third user named Elijah. In response to Elisabeth selecting the "Specific matches?" button, the social networking application 122 can display a user interface to enable Elisabeth to select one or more trusted contacts to each of her matched individuals. In some examples, Elisabeth may select the same trusted contacts to each of her matched individuals. In some examples, Elisabeth may select a combination of different and similar trusted contacts for each of her matched individuals. Elisabeth may designate the trusted contacts based on various criteria. The criteria can include, for example, Elisabeth's location in relation to the matched individual's location, a personal preference, and other criteria relating to Elisabeth's selection of trusted contacts.

In some implementations, the user interface 408 enables the user to adjust their currently selected contacts. The user can deselect prior trusted contacts and in response, select different or similar contacts to apply as a trusted contact. In some examples, the user can adjust a maximum number of trusted contacts to be added to their profile. The maximum number of contacts can be configurable by the user and range from 1 to N number of trusted contacts. Similarly, the user can configure a set number of contacts for each of the specific matches or adjust a previously set number of contacts for each of the specific matches. In some examples, the user can also preconfigure a set number of trusted contacts for each of the matches each time the user obtains a new match using the social networking application 122. For example, the user can designate their mother, father, brother, uncle, and aunt as trusted contacts each time the user matches to a new person. In this manner, the user can reduce the amount of time designating matches with their profile as the trusted contacts can be pre-configured by the social networking application 122.

Figure 4C:
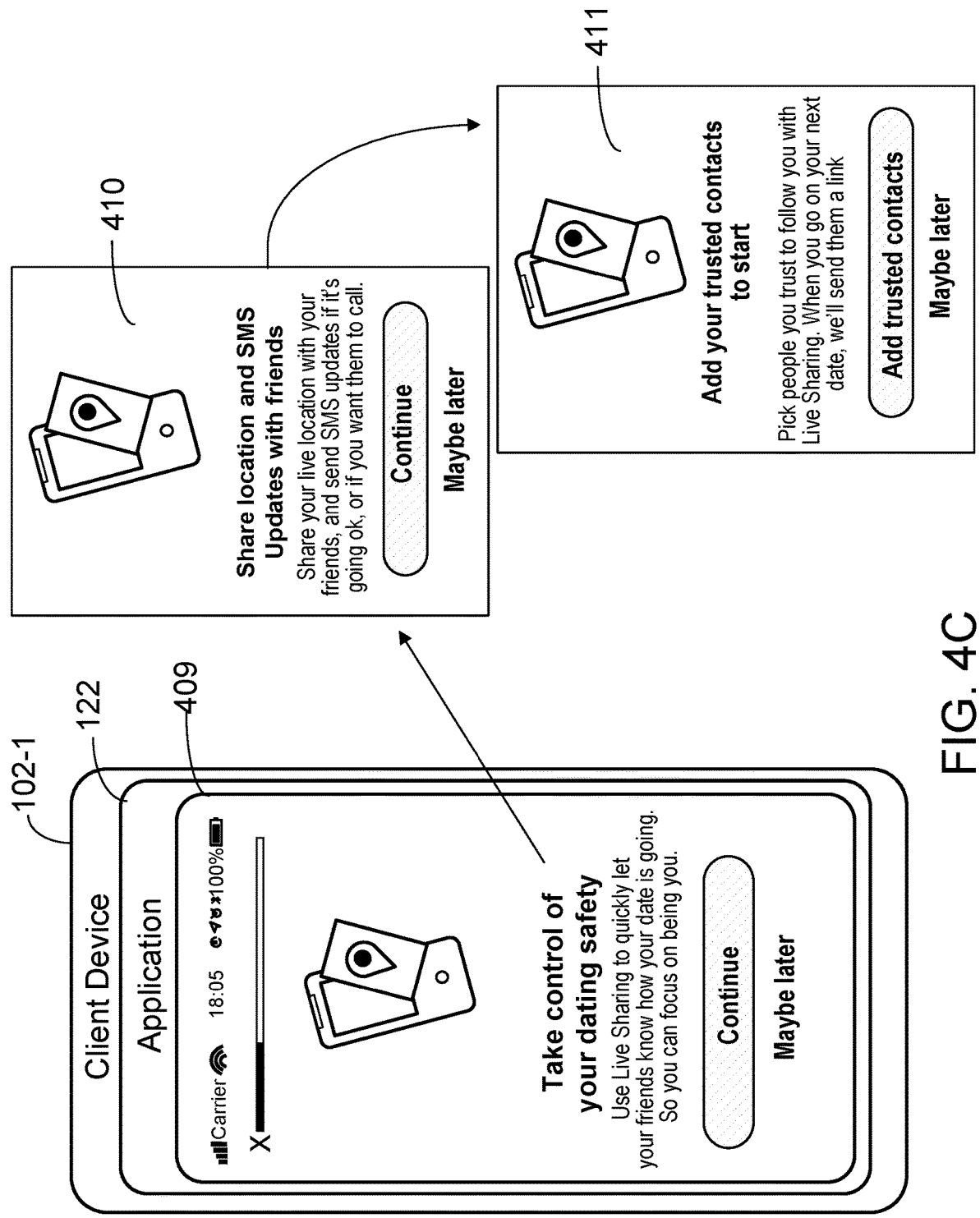

FIG. 4C is another block diagram that illustrates an example of user interfaces during safe monitoring of a social networking environment. In some implementations, the social networking application 122 can display user interface 409 in response to the user interacting with the "How does Live sharing work" button on the user interface 406. Specifically, the user interface 409 can provide explanatory information regarding how the "live sharing" mode works. For example, the user interface 409 describes "Take control of your dating safely" and "Use Live Sharing to quickly let your friends know how your date is going. So you can focus on being you." These descriptions delineate to the user that the "live sharing" mode enables the user to be monitored safely while the in-person meetup is ongoing. The user can then select the "Continue" button to proceed with the explanation of how "live sharing works" or can select the "Maybe later" button to cease the explanation and return to user interface 406.

In some implementations, in response to the user interacting with the "Continue" button on the user interface 409, the social networking application 122 can transition the user interface 409 to user interface 410. The user interface 410 describes additional information regarding how the "live sharing" mode operates. Specifically, the user interface 410 describes that during the "live sharing" mode, the social networking application 122 can "Share location and SMS updates with friends" and "Share your live location with your friends, and send SMS updates if it's going ok, or if you want them to call." The user can then select the "Continue" button to proceed with the explanation of how "live sharing works" or can select the "Maybe later" button to cease the explanation and return to user interface 406.

In some implementations, in response to the user interacting with the "Continue" button on the user interface 411, the social networking application 122 can transition the user interface 410 to user interface 411. The user interface 411 describes additional information regarding how the "live sharing" mode operates and enables the user to select one or more trusted contacts during an in-person meetup. Specifically, the user interface 411 describes to "Add your trusted contacts to start" and "Pick people you trust to follow you with Live Sharing. When you go on your next date, we'll send them a link." The user can then select the "Add trusted contacts" button to proceed with selecting one or more trusted contacts or can select the "Maybe later" button to cease the explanation and return to user interface 406.

Figure 4D:
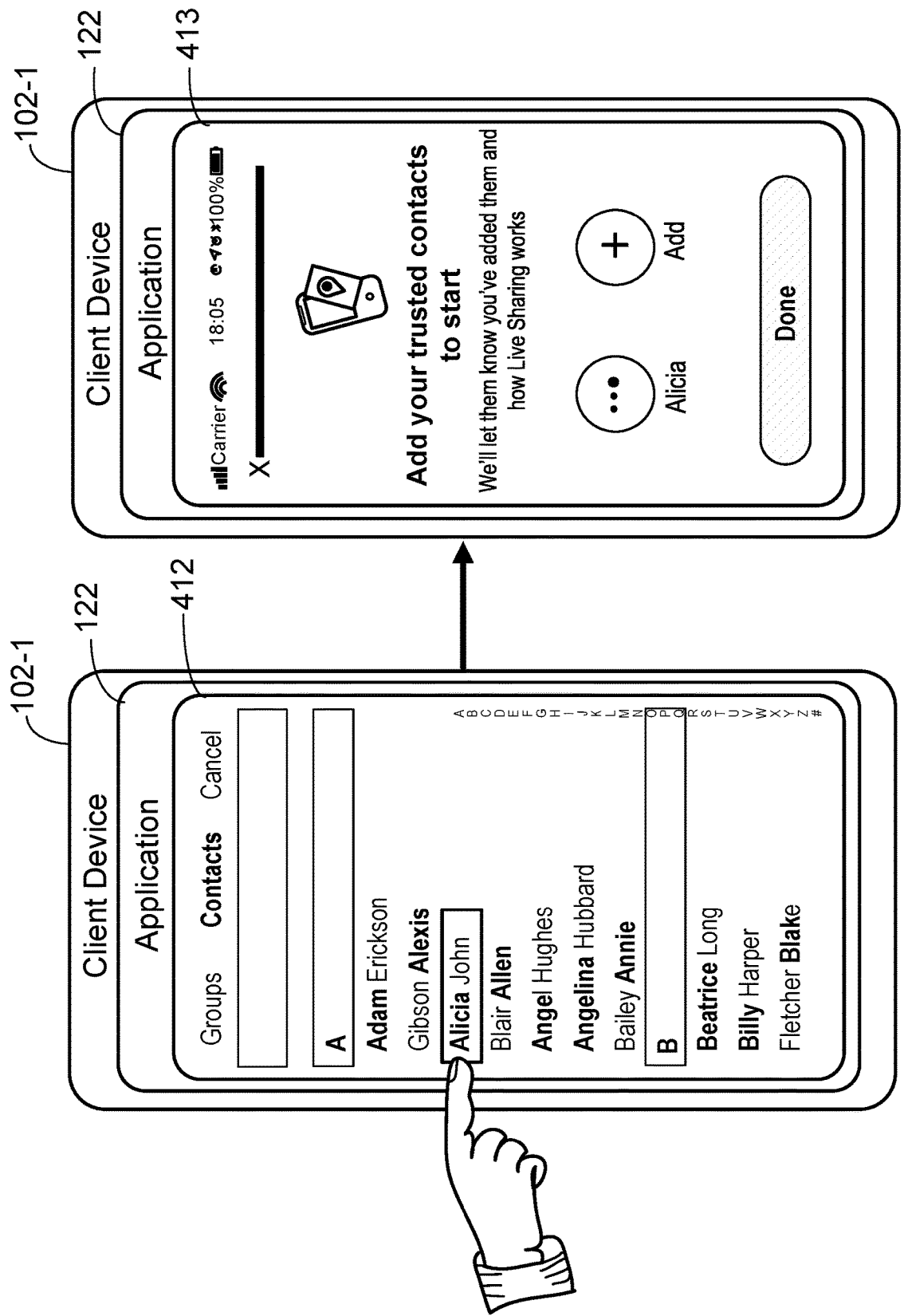

FIG. 4D is another block diagram that illustrates an example of user interfaces during safe monitoring of a social networking environment. In some implementations, the social networking application 122 can display user interface 412 in response to the user interacting with the "Add trusted contacts" button illustrated on the user interface 411. Moreover, the social networking application 122 can display user interface 412 in response to the user interacting with the "Add trusted contacts" button illustrated on the user interface 407.

In some implementations, the user interface 412 can display a list of contacts for the user associated with the client device 102-1 to add as a trusted contact. In some examples, the social networking application 122 can display a list of contacts on the user interface 412 from a variety of sources. The sources can include, for example, the contact list of the client device 102-1, contact lists, e.g., email addresses and phone numbers, associated with an account on user's corresponding email application, and contact lists stored on the server 104 associated with the user's profile. The contact lists may store for each contact, for example, a name of a person, a self-portrait of the person, a telephone number of a client device associated with the user, a home address and a work address of the person, an email address of the person, and other contact information of the person.

The user can interact with one or more contacts on the contact list shown on user interface 412 to designate a trusted contact. In some implementations, the user can interact with a specific contact on the contact list to designate as a trusted contact. In some examples, the user can select a user named "Alicia John" on the user interface 412 by interacting with the social networking application 412 on the client device 102-1. In some examples, the user can search for a particular contact on the user interface 412. In some examples, the user can drag his/her finger on the vertical alphabet on the right side of the user interface 412 to navigate to contacts whose names start with a particular letter shown on the vertical alphabet. In response to selecting a user on the contact list on the user interface 412, the social networking application 122 can transition the user interface 412 to user interface 413. The user interface 413 can display information related to the selection of a designated trusted contact.

Specifically, the user interface 413 can describe the following information "Add your trusted contacts to start" and "We'll let them know you've added them and how Live Sharing works." In some implementations, the user interface 413 can also display one or more graphical user interface elements illustrating previously selected trusted contacts and additional selections of trusted contacts. For example, the user interface 413 displays a graphical user interface element of the contact Alicia being designated as a trusted contact and another graphical user interface element as a "(+) Add" sign indicating to the user add additional trusted contact(s).

In some implementations, the graphical user interface element of the contact on user interface 413 can display various states. The various states can include, for example, (i) pending approval as a trusted contact, (ii) accepted as a trusted contact, and (iii) denied as a trusted contact. For instance, in response to the user selecting a contact, e.g., Alicia John, as a trusted contact, the social networking application 122 can transmit a notification to the server 104 to indicate that the user Elisabeth, that is associated with a particular profile, requests to add "Alicia John" as a trusted contact to her profile. The social networking application 122 can display a notification as (i) pending approval as a trusted contact to indicate to the user, i.e., Elisabeth, that the server 104 is in the process of obtaining Alicia John's approval. The notification on the graphical user element can be displayed as, for example, three dots, a question mark, or another graphical element. The social networking application 122 can display a notification as (ii) accepted approval of a trusted contact to indicate to the user, i.e., Elisabeth, that the server 104 has received permission from the trusted contact, i.e., Alicia John, to include her as a trusted contact for the user. This notification can include, for example, a checkmark, the trusted contact's initials, or a color, such as green, to indicate that the selected contact has approved use for the trusted contact. Similarly, the social networking application 122 can display a notification as (iii) denied approval of a trusted contact to indicate to the user that the server 102 has received an indication that the user has denied or rejected the user as a trusted contact. This notification can include for example, the letter "X," a red color, or a notification to indicate that the corresponding user has rejected the server 104'2 request to be included as a trusted contact. Other graphical user interface examples to display statuses are also possible.

By displaying a graphical user element indicative of a status for a pending/accepted/rejected trusted contact, the user, i.e., Elisabeth, can quickly review the user interface 413 to determine a status of a selected contact to be a trusted contact without having to perform additional functions on the client device 102-1. The graphical status updates can reduce the amount of functions that have to be performed in the client device 102-1 and enable the user to obtain all the necessary information about a status of trusted contacts from a single user interface, e.g., user interface 413. As a result, the display of the graphical user interface elements on the user interface 413 can aid the user in obtaining the relevant information and ultimately, the user can avoid opening different applications on the client device 102-1 to contact the user. In this manner, the social networking application 122's display of the graphical user interface elements on the user interface 413 aids in reducing the amount of processing and computations needed to be performed by the client device 102-1 for obtaining status on designation of trusted contacts.

In response to designating a contact as a particular trusted contact, the user can designate one or more additional contacts by interacting with the "(+) Add" button on user interface 413. In response to interacting with the "(+) Add" button, the social networking application 122 can transition the user interface 412 to the user interface 412. Here, the user can select a different contact to be designated as a trusted contact. If a user has accepted, rejected, or is in the process of being approved as a trusted contact, the social networking application 122 can disable that corresponding user as a selectable contact on the contact list on the user interface 412. In this case, the user cannot reselect a user who has already accepted the designation as a trusted contact and the user cannot reselect a user who has already denied the designation as a trusted contact. The user can continue to add one or more trusted contacts from the contact list on user interface 412 until the desired number of trusted contacts has been selected. Once the user has finished designating a preferred number of trusted contacts, the user can select the "Done" button on the user interface 413. The number of designated trusted contacts can then be stored in the profile of the user, e.g., Elisabeth's profile. This information can be stored on the social networking application 122 on the client device and in the database 148 connected to the server 104.

In some implementations, the user may need to return to user interface 412 to select additional contacts as designated contacts if a designated number of contacts fall below a preferred number. For example, the user may desire to designate ten contacts as trusted contacts. In response, the user may select ten contacts from the contact list of user interface 412 to be applied as trusted contact. The social networking application 122 can transmit a notification to the server 104 to request approval from the ten contacts to be designated as trusted contacts. In response to the server 104 requesting these users be designated as trusted contacts, the server 104 may transmit a notification to the client device 102-1 indicating that three of the ten contacts declined the requests to be designated as trusted contacts and the remaining seven contacts accepted the trusted contact designation. The social networking application 122 may provide a notification to the client device 102-1 to indicate to the user a response on the trusted contacts. In some examples, the user may then desire to return to user interface 412 to select three different contacts to designate as trusted contacts. In some examples, the user may desire to stick with seven trusted contacts and not add any additional designated trusted contacts. Other examples are also possible.

Figure 4E:
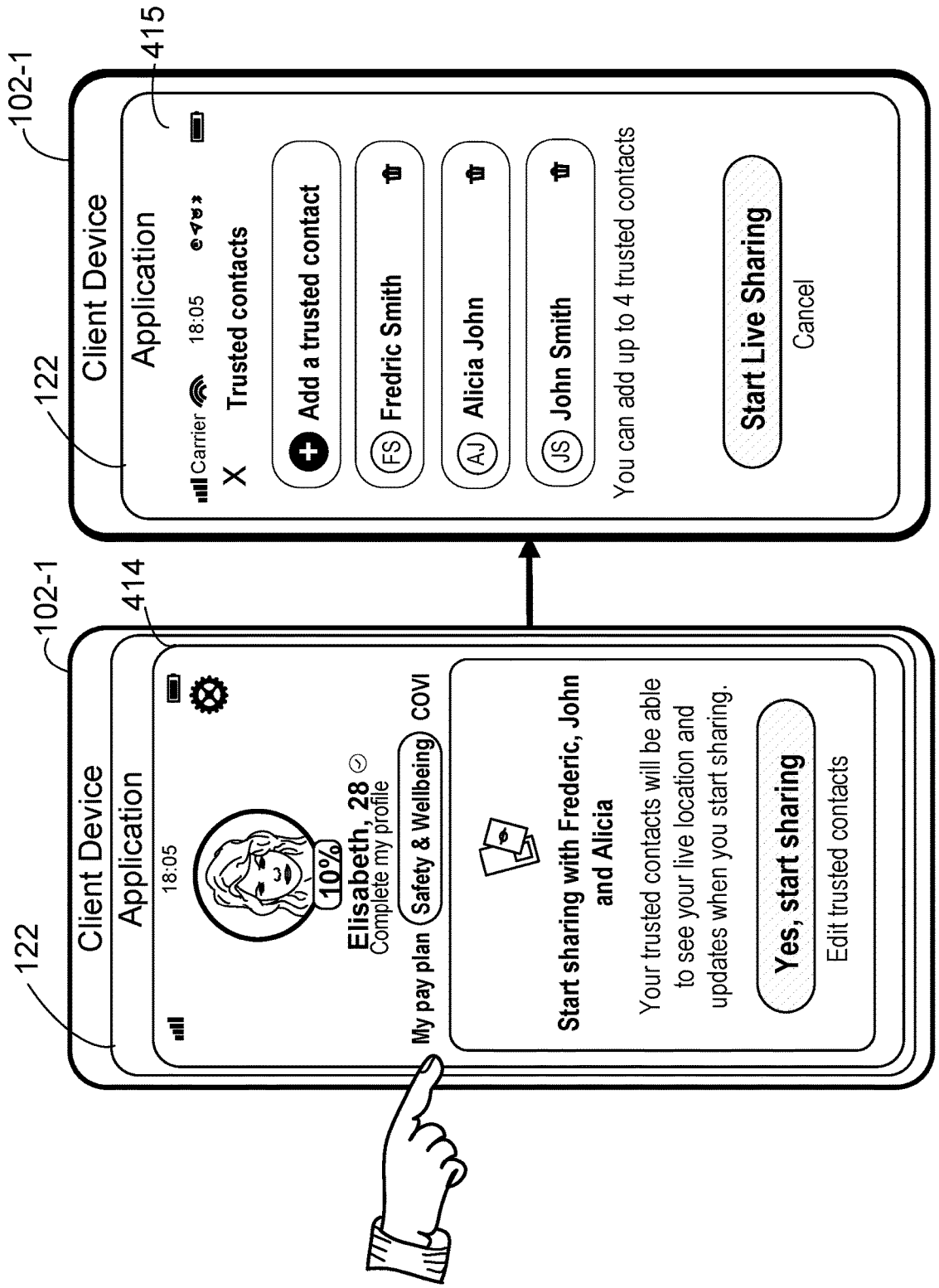

FIG. 4E is another block diagram that illustrates an example of user interfaces during safe monitoring of a social networking environment. In some implementations, the social networking application 122 can display user interface 414 in response to the user interacting with the "Done" button on the user interface 413. In response to selecting the "Done" button on the user interface 413, the social networking application 122 can transition the user interface 413 to user interface 414 where the user's profile is established. At this stage, the user can select to start sharing their location with their selected trusted contacts, e.g., Frederic, John, and Alicia.

In some implementations, the user interface 414 can provide the user with the option to initiate sharing of their live location. However, the user, i.e., Elisabeth, may desire to start sharing their location when starting an in-person meetup with a matched user. In the meantime, the user can return to user interface 400 to identify additional matches, communicate with one or more matched individuals, adjust further settings in their corresponding profile, or perform other functions. The user interface 414 also enables the user to edit their selected trusted contacts by interacting with the "Edit trusted contacts" button.

In response to the user selecting the "Edit trusted contacts" button on the user interface 414, the social networking application 122 can transition the user interface 414 to the user interface 415. The user interface 415 can display the trusted contacts for the user, i.e., Elisabeth. Specifically, the user interface 415 indicates that the users "Fredric Smith," "Alicia John," and "John Smith" have accepted the user's request to be trusted contacts. The user, i.e., Elisabeth, can decide whether to can decide whether to add a trusted contact by selecting the "Add a trusted contact" button or delete one or more of the currently existing designated trusted contact by selecting the trash can indicator.

If the user decides to add another trusted contact, then the social networking application 122 can transition the user interface 415 to the user interface 412, where the user can select an additional contact to be designated as a trusted contact. In some implementations, the social networking application 122 can designate a maximum number of trusted contacts for the user. As illustrated in user interface 415, the social networking application 122 can illustrate to the user that "You can add up to 4 trusted contacts." However, other examples are possible, and the user can designate 1 to N number of trusted contacts, if they so desire.

In some implementations, the user can initiate the "live sharing" mode in response to selecting the "Yes, start sharing" button on user interface 414 or the "Start Live Sharing" button on user interface 415. The user can initiate the "live sharing" mode for a particular match. For example, the social networking application 122 can display a user interface that enables the user to communicate with another matched user. In that user interface for communicating with another matched user, the user interface can display a graphical user interface element that enables the user to select to initiate "live sharing" for just that particular match. The social networking application 122 does not share "live sharing" information with trusted contacts associated with other matches for the user.

In response to the user interacting with the button on user 414 or the button on user interface 415 to initiate the "live sharing" mode, the social networking application 122 can transmit data to the server 104 to initiate the "live sharing" mode. The data can include, for example, the data identifying the user or the user profile of the corresponding to the client device, data indicating the user has requested to activate the "live sharing" mode, data identifying the client device, and data identifying which matched user the user is requesting "live sharing" for an in-person meetup. The safe monitoring engine 146 can receive this information, activate the "live sharing" mode for this particular user and the corresponding match, and store the received data from the client device associated with the user in a profile associated with the user in the database 148. In this manner, the safe monitoring engine 146 can ensure that only those individuals who are designated as trusted contacts for this specific match can be notified of any "live sharing" notifications.

In some examples, prior to a user starting an in-person meetup, the user can interact with the "Yes, start sharing" button on user interface 414 or the "Start Live Sharing" button on user interface 415. In some examples, the safe monitoring engine 146 may detect a proposed in-person meetup between a first user and second user from the communications between their two respective client devices that communicate through the server 104. In response, the safe monitoring engine 146 may prompt each of the users who are planning to hold the in-person meetup with a user interface to start "live sharing" mode prior to the proposed in-person meetup date and time.

In some implementations, two users may set a proposed in-person meetup date and time during their conversation through the social networking application 122 on their respective client devices 102-1 and 102-N. For example, Elisabeth may match with Mark on the social networking application 122. In response to match, Elisabeth and Mark can communicate with one another over the social networking application over a communication channel, i.e., from social networking application 122 on client device 102-1 through server 104 to social networking application on client device 102-N. Elisabeth and Mark may communicate through the social networking application 122 via a telephone call, a video call, audio messages, text messaging, some combination of the aforementioned communication mediums or another form of communication. During the conversation, Elisabeth and Mark may decide to move the conversation to an in-person meeting. Elisabeth and Mark can communicate a date, time, and location for the in-person meetup. This can include, for example, Oct. 15, 2022 at 8:00 PM at Starbucks™ in Notting Hill, London.

In some implementations, prior to the in-person meetup, the first user and/or the second user can initiate the "live sharing" mode. The users, i.e., Elisabeth and Mark, may respectively start the "live sharing" mode on their respective social networking applications 122 a predetermined amount of time prior to the start of the in-person meetup. The predetermined amount of time can include, for example, 1 minute prior to the in-person meetup, 5 minutes prior to the in-person meetup, 10 minutes prior to the in-person meetup, 1 hour prior to the in-person meetup, or some other prior time. This predetermined amount of time can be user configurable. In some examples, Elisabeth may indicate in her social networking application 122 through the client device 102-1 an amount of time prior to the proposed in-person meet-up to start the "live sharing" mode. In some examples, Elisabeth may interact with one of the "Start Live Sharing" buttons, e.g., on user interface 415 or user interface 414, as she is traveling to the in-person meetup. Users may travel to the in-person meetup by car, train, walking, or biking, and they may start the live sharing at any point in time leading up to the in-person meetup and during the in-person meetup.

In some implementations, the server 104 can detect (i) a proposed in-person meetup plan and detect (ii) the start of the in-person meetup plan. Specifically, the safe monitoring engine 146 can detect the (i) proposed in-person meetup plan through communications between the first user and second user through the social networking applications 122 of their respective client devices. For example, the safe monitoring engine 146 can monitor text messages or audio messages that travel between client device 102-1 and client device 102-N and predict when a proposed in-person meetup has been communicated. The safe monitoring engine 146 can use optical character recognition (OCR) techniques on text, predictive neural engines that classify text or audio as those that produces likelihoods of proposed plans of in-person meetups, and other algorithms that can detect when such in-person meetups are planned. The predictive neural engines can include one or more machine learning models that have been trained to classify text or audio as a potential plan. For example, the one or more machine-learning models can include a Long Short Term Memory (LSTM) Recurrent Neural Network (RNN) that can learn long-term dependencies of words, such as dependencies between textual or audio words, that are likely to resemble conversations of proposed plans of in-person meetup.

The server 104 can train the one or more machine-learning models on words such as, for example, "What day and time works for you to meet?", "When are you free to meet?", "I am free at 7:30 PM after work", "Let's meet at McDonalds", "Can you reschedule to tomorrow at 6:00 PM?" or other words or phrases that have a connotation of a date and time for meeting. The server can train these one or more machine-learning models to produce likelihoods that a set amount of conversation is referring to a proposed in-person meetup. During implementation, the server 104 can compare these output likelihoods to a threshold value to determine an accuracy of the trained models' prediction. If the server 104 determines that the prediction satisfies, e.g., equal to or exceeds, to the threshold value, then the server 104 may store data that represents a date, time, and place meetup for two users. The server 104 can also store their corresponding identifier information with the data. The identifier information can include, for example, data identifying each users client device, the name of each of the users, and communication history between each of the users.

In some implementations, the server 104 may transmit a notification to each of the users in response to producing a prediction likelihood that exceeds a threshold value. Specifically, the server 104 can transmit a notification to the social networking application 122 of each client device, e.g., client devices 102-1 and 102-N, to confirm whether a proposed in-person meetup time has been planned. The notification can ask the user to confirm whether the server 104 accurately detected a proposed in-person meetup between the two users. The two users can each confirm on their respective client devices whether a proposed in-person meetup was accurate detected from the conversation. If each user confirms, then the server 104 may store a reminder to ask each user if they prefer to start the "live sharing" mode closer to the date and time of the proposed in-person meetup. If each user denies, then the server 104 can use the conversation history to retrain the currently trained predictive model to indicate that the output was inaccurate. Similarly, the server 104 can increase the threshold value to improve the accuracy of the trained model's predictions going forward. If one user denies and the other confirms, then the server 104 can indicate to the user who confirmed that the other user has denied the existence of a potential meetup. The server 104 may take no further action as the trained model's accuracy is potentially accurate, but the user who denied changed their mind.

In some implementations, the server 104 can initiate the "live sharing" mode automatically using various criteria. The server 104 may determine a current date and compare the current date to stored dates that correspond to dates and times of in-person meetups. In response to determine that the current date matches to one or more stored dates and that a current time is within a threshold amount of time to the start of a proposed in-person meetup, the server 104 can then retrieve data identifying users and their corresponding client device identifiers who are planning an in-person meetup on the current date. The server 104 can then use the data identifying the client device identifiers and periodically obtain location information of the corresponding client devices for the two users, e.g., Elisabeth and Mark, continuing with the example from above. When the server 104 detects that the location information of the corresponding client devices for the two users are satisfy a geographical distance threshold from one another, then the server 104 may automatically turn on the "live sharing" mode for both of these client devices. For example, the server 104 may set the geographical distance threshold to be 1 mile or some other user-defined value. Additionally, the server 104 may determine the threshold amount of time, e.g., one hour or some other user configurable time, the difference between the current time to the start time of the proposed in-person meetup.

For example, in response to determining that the two client devices are 1 mile from one another or less than 1 mile from one another, e.g., satisfying the geographical distance threshold, and 50 minutes exist between the current time and the start time of the proposed in-person meetup, e.g., satisfying the time threshold, the server 104 can transmit a notification to the social networking application 122 on both client devices 102-1 and 102-N that causes the social networking application 122 to automatically initiate the "live sharing" mode. In some examples, the notification transmitted to the social networking application 122 on both client devices 102-1 and 102-N can cause the social networking application 122 to prompt the corresponding user with whether they would like to initiate the "live sharing" mode because the server 104 has detected that a proposed in-person meetup between two individuals is imminent. In the former example, the social networking application 122 can display a notification on the user interface 415 that indicates the "live sharing" mode has started. In the latter example, the user has control over whether they desire to start the "live sharing" mode or not.

Figure 4F:
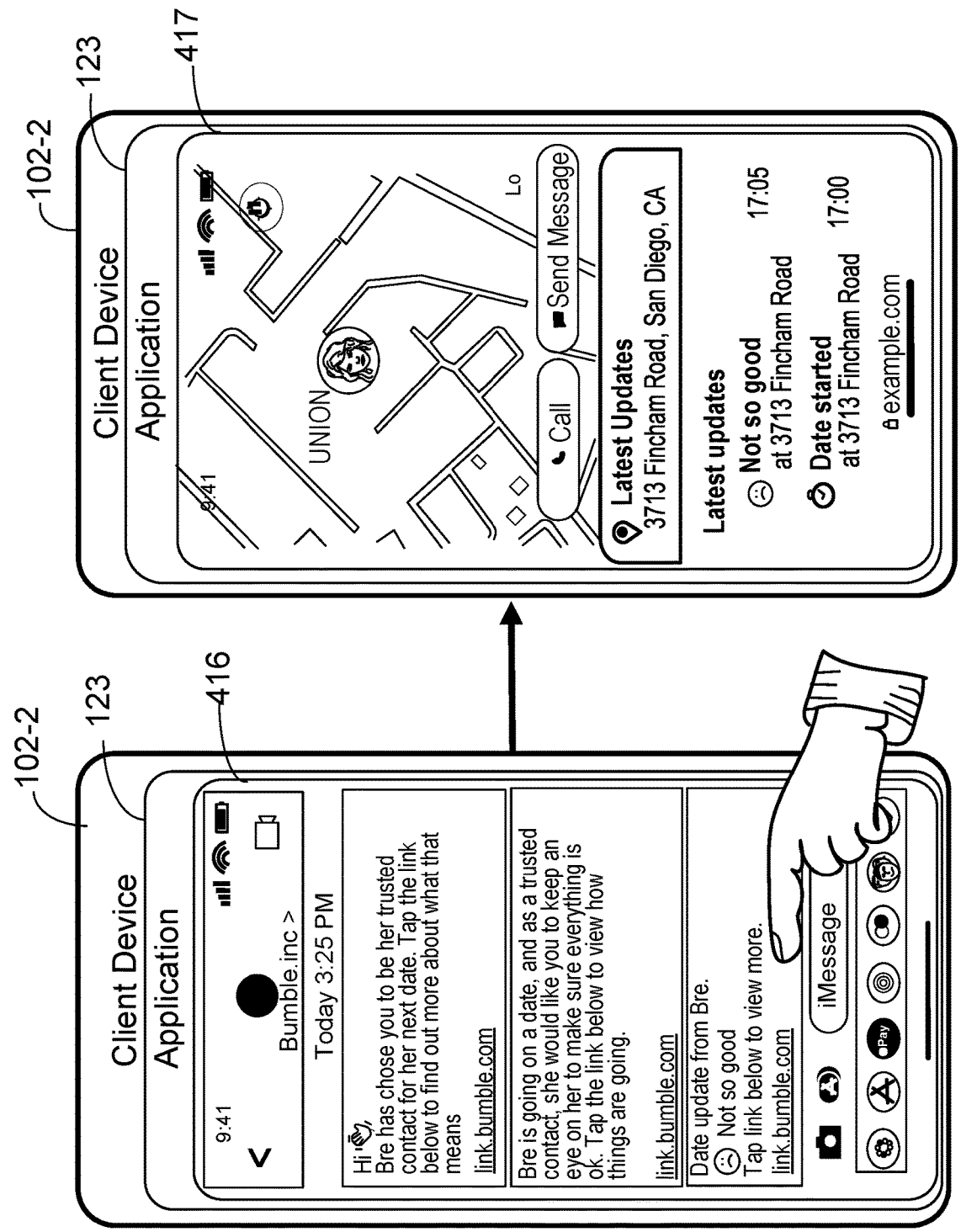

FIG. 4F is another block diagram that illustrates an example of user interfaces during safe monitoring of a social networking environment. In some implementations, the user interfaces 416 and 417 illustrate the user interfaces provided to the client devices of the trusted contacts. Specifically, the client device 102-2 can include an application 123 that displays user interface 417 to enable the trusted contacts to view information about a person using the social networking application 122.

For example, as illustrated in user interface 416, Bre is a user who is interacting on the social networking application 122 with client device 102-1. Bre has selected the user of client device 102-2 named Emily as a designated trusted contact for Bre. Bre and Emily may be friends, family, or acquaintances, and Bre has selected Emily as someone she trusts to monitor Bre for her next in-person meetup. Emily receives a first text message from the server 104. The first text message, as illustrated on user interface 416, recites "Hi, Bre has chosen you to be her trusted contact for her next date. Tap the link below to find out more about what that means." Emily can interact with the link on the first text message, e.g., "link.bumble.com," to be taken to a web page or another application where Emily can (i) review the requirements of being a designated trusted contact and (ii) accept the designation of a trusted contact or (iii) reject the designation of a trusted contact. Emily can indicate whether she accepts or rejects the designated trusted contact and in response, the application 123 can transmit a response to the server 104 confirming whether Emily accepts or rejects the designated trusted contact.

Continuing with the example, at a later point in time, Bre may decide to pursue an in-person meetup. In response to the start of the in-person meetup or prior to the start of the in-person meetup, the server 104 can transmit a second text message to Emily, as illustrated on user interface 416, that recites "Bre is going on a date, and as a trusted contact, she would like you to keep an eye on her to make sure everything is ok. Tap the link below to view how things are going." Emily can then interact with the link in the second text message, e.g., "link.bumble.com," to be taken to a web page or another application where Emily can review the status of Bre's current in-person meetup. The server 104 can transmit a user interface, application 123, or web page to Emily's client device Emily to review Bre's status updates.

For example, in response to Emily selecting the link in the second text message, Emily can review the status of Bre's current and ongoing in-person meetup, as illustrated in user interface 417. In some implementations, the user interface 417 can illustrate (i) a map showing Bre's current location and (ii) a list of statuses that describe historical events associated with the in-person meetup. The map showing Bre's current location can also illustrate, for example, Bre's last known locations or Bre's last 10 previous locations. In this manner, Emily can view how Bre has moved over a prior predetermined time period. Similarly, the map is overlaid with the option to "Call" or "Send Message" to Bre, should Emily desire to do so.

The user interface 417 also displays (ii) the list of statuses that describe historical events associated with the in-person meetup. The list of statuses can describe, for example, a time, date, and address location of where the in-person meetup started. The start of the in-person meetup can be defined by one or more of various factors, for example, (i) the start of each user's "live sharing" mode, (ii) the proposed date/time of the planned in-person meetup, and (iii) a time at which the two users satisfied a geographic threshold distance of one another. In this manner, Emily can monitor when and where the in-person meetup started.

Similarly, the user interface 417 can provide status updates during Bre's in-person meetup. As will be further described with respect FIG. 4H, during the in-person meetup, Bre can provide status updates that indicate how the in-person meetup is going. The server 104 can receive these status updates from Bre's client device 102-1 and the server 104 can push these status updates to the website or application that can be accessed by each of Bre's trusted contacts, including Emily. Thus, when Bre provides a status update which is subsequently pushed to the website or application, Emily can view that status update with a timestamp. For example, as shown in user interface 417, Emily can view a status update that describes "Not so good at 3713 Fincham Road at 17:05." Moreover, the status update can be accompanied by a particular emoji, e.g., a sad face, which represents a meaning of the status update. The user interface 417 can display a list of status updates that Emily can review over time to determine and monitor how the in-person meetup is going.

Each time Emily receives a status update that indicates how the in-person meetup is going, Emily can receive an additional text message. For example, on user interface 416, Emily's application 123 received a third text message that reads "Date update from Bre. Not so good. Tap link below to view more. Link.bumble.com". Emily can then tap the link and be taken to user interface 417 to view status updates regarding Bre's in-person meetup. Similarly, each time an additional text message is received describing a status of the in-person meetup, that same status is updated on the user interface 417. In this manner, Emily can receive text messages that describe the status of the in-person meetup and can view that same status on the user interface 417.

In some implementations, the server 104 can implement a group chat between each of the trusted contacts. The server 104 can transmit a link to each of the client devices of the trusted contacts that enables each trusted user of the client devices to join a group chat. The group chat enables each trusted contact to communicate with one another while the user, i.e., Bre, is on the in-person meetup. The server 104 can also provide the status updates to the trusted users or trusted contacts in the group chat so they can collectively view Bre's statuses and can collectively discuss what actions should be taken should Bre request for assistance. Should Bre decide to cease the "live sharing" mode, the server 104 can end the group chat between the trusted users.

Figure 4G:
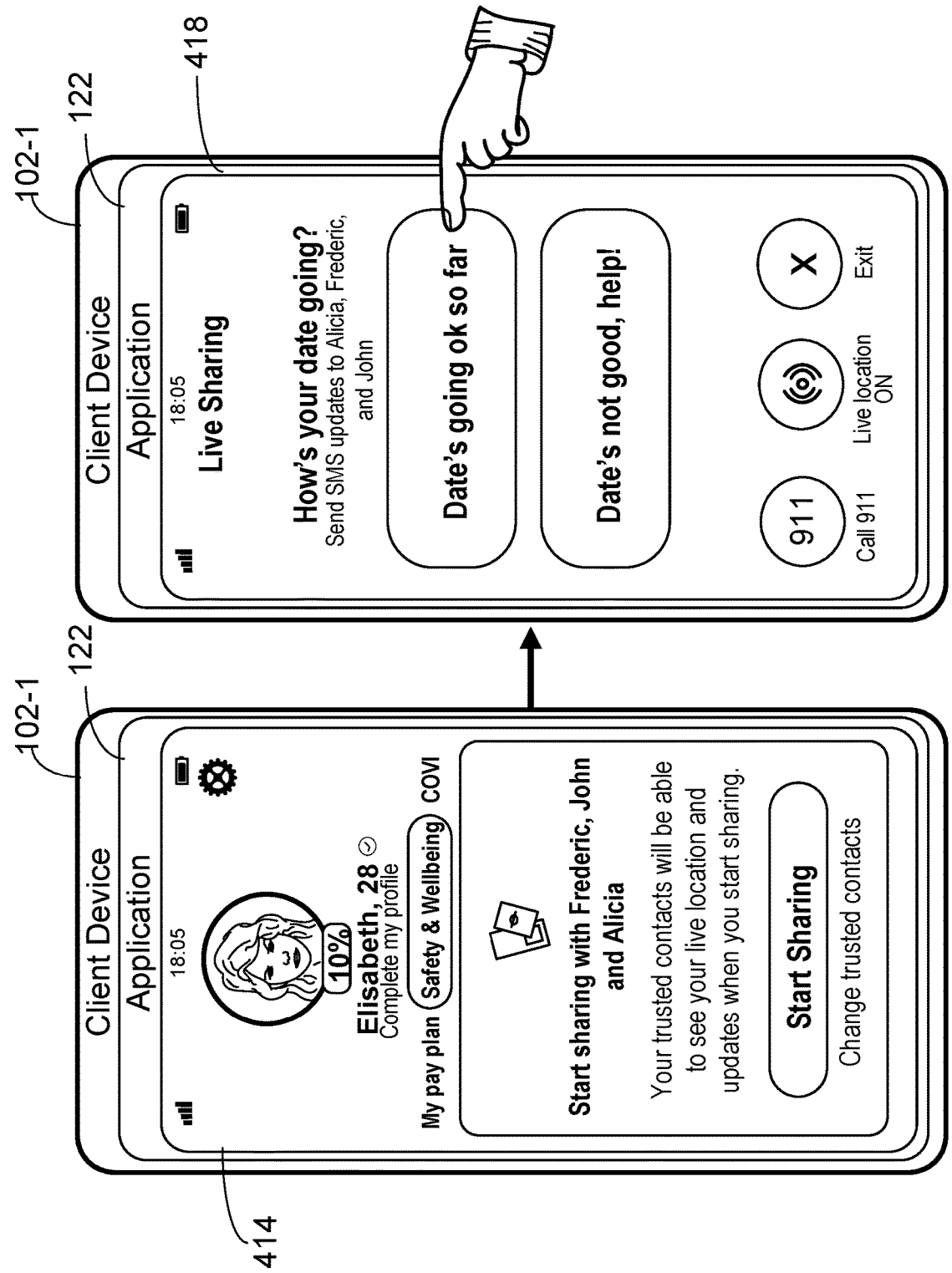

FIG. 4G is another block diagram that illustrates an example of user interfaces during safe monitoring of a social networking environment. In some implementations, the social networking application 122 can display user interface 414 in response to the user interacting with the "Done" button on the user interface 413. When the user associated with client device 102-1, e.g., Elisabeth, decides to initiate the "live sharing" mode because the in-person meetup is about to occur or the social networking application 122 automatically starts the "live sharing" mode based on a detection of a proximity to the other user or another criteria, the social networking application 122 can transition the user interface 414 to the user interface 418 where the user can provide status updates regarding how the in-person meetup is going.

In some implementations, the social networking application 122 can request status updates from the user during the in-person meetup. In some implementations, the safe monitoring engine 146 may send periodic requests to the social networking application 122 on client device 102-1 requesting for status updates from the user during the in-person meetup. These periodic reminders can be sent based on elapsed countdowns. In some examples, the social networking application 122 can display user interface 418 during the entirety of the in-person meetup. In some examples, the social networking application 122 can display user interface 418 only when requesting for status updates from the user during the in-person meetup. In the latter example, the user interface 418 can return to user interface 400 in response to the user providing a status update.

In some implementations, the status update may include preconfigured response for the user's interaction. During an in-person meetup, the user may not have the time to provide detailed status updates due to their conversation with the other person. As such, during quick breaks, such as bathroom breaks or pauses in conversation, the user can provide a quick status update by interacting with the user interface 418. For example, the user interface 418 poses a question to the user—"How's your date going? Send SMS updates to Alicia, Frederic, and John", which indicates to the user a question asking how the in-person meetup is going and provides instructions regarding sending one or more updates to the user's trusted contacts, designated from previous user interfaces.

The user can interact with one or more of the statuses on the user interface 418 and one or more other graphical user elements. For example, the one or more statuses can describe pleasant or unpleasant engagements, such as, "Date's going ok so far" or "Date's not good, help!" Similarly, the user can interact with one or more graphical user elements at the bottom of the user interface 418. The one or more graphical user elements at the bottom of the user interface 418 can include, for example, "Call 911", "Live Location ON" and turning it off, and "Exit", which exits the "live sharing" mode.

In response to interacting with the one or more statuses, the social networking application 122 can receive the user's selection and transmit the response of the selected status to the server 104. The safe monitoring engine 146 can receive the user's selection of the status and push the selected status to the website, application, or as a text message to each of the trusted contact's client device, or some combination of the above. The resulting notification is similar to the notification provided and illustrated in user interfaces 416 and 417 of FIG. 4F. Similarly, the user can interact with the one or more graphical user elements at the bottom of the user interface 418 to (i) Call 911 in case of an emergency, (ii) turn on or off the live location, or (iii) exit the "live sharing" mode.

In some implementations, the application 122 can instantiate one or more additional actions in response to the user interacting with the "Call 911" button. The one or more additional actions can include safety actions that further protect the user on the date and can be used for further security. For example, in response to the user interacting with the "Call 911" button on the user interface 418, the application 122 can initiate video recording using the one or more cameras on the client device 102-1. Alternatively or additionally, the application 122 can initiate audio recording using the one or more microphones on the client device 102-1. In some examples, the application 122 can transmit a request to the server 104 requesting for emergency services. In response, the server 104 can transmit data to the client device 102-1 causing the client device 102-1 to start recording video and/or audio of the environment. In this manner, the client device 102-1 can initiate recording of the environment in which the user feels unsafe in order to capture aspects of the unsafe environment. The stored video and audio can be stored in real-time or post recording in various locations, e.g., the client device 102-1, a cloud network, the database 148 connected to the server 104, or another remote device. In some examples, the application 122 can share the stored and recorded video and audio to emergency services and to each of the client devices of the trusted contacts. In some examples, the application 122 can share the stored and recorded video and audio to the server 104, which sends the data, e.g., audio and video, to the emergency services and to each of the client devices of the trusted contacts. In this manner, the emergency services and/or the trusted contacts can take steps to remediate the user in the unsafe situation. The audio and/or video can be automatically recorded and shared until live sharing is cancelled.

Figure 4H:
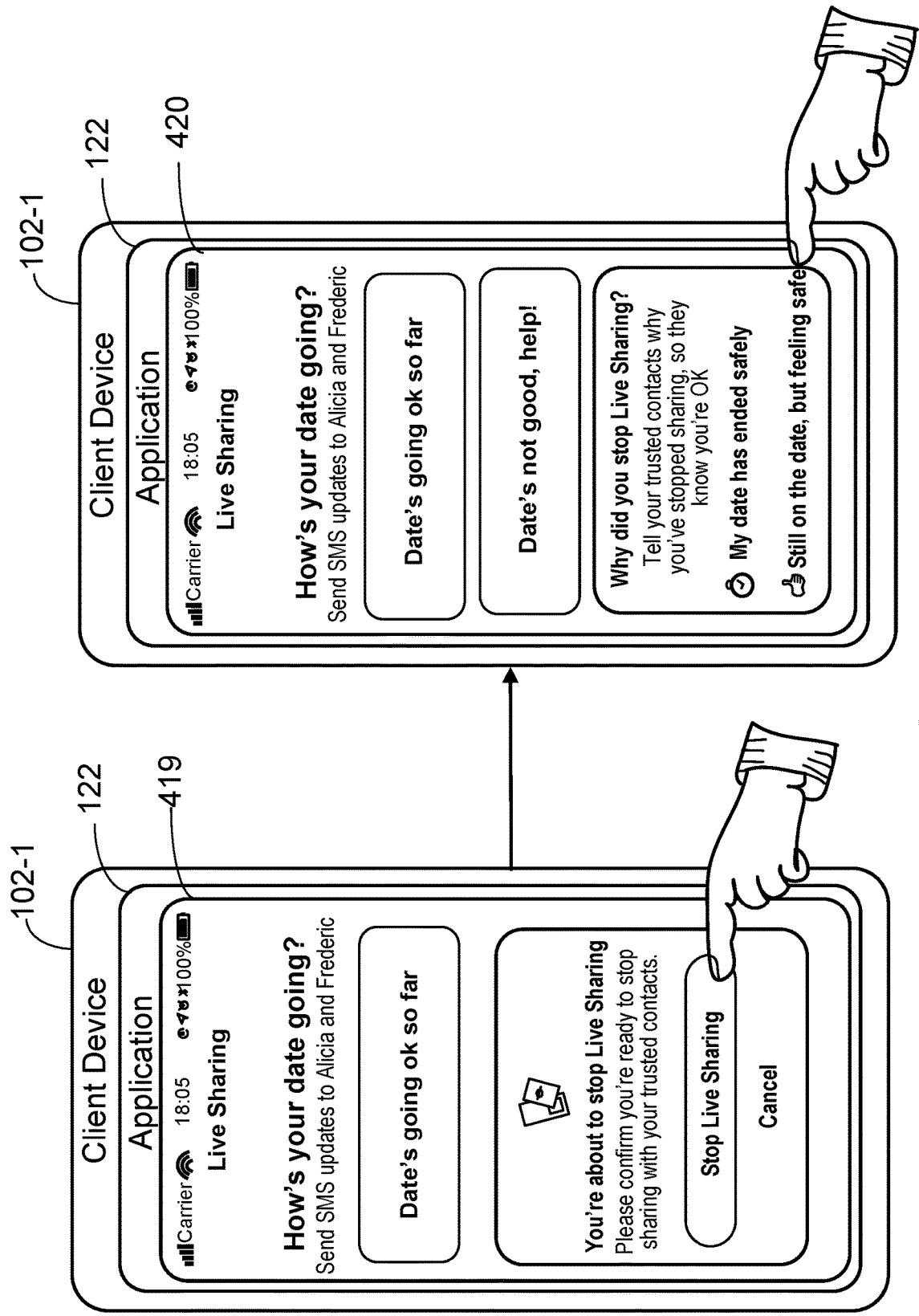

FIG. 4H is another block diagram that illustrates an example of user interfaces during safe monitoring of a social networking environment. In some implementations, the social networking application 122 can display user interface 419 in response to the user (i) switching the "Live Location ON" button to off or (ii) interacting with the "Exit" button, both found on user interface 418. At this stage, the user is provided with additional verifications to ensure the user desires to stop the "live sharing" mode.

For example, as shown in user interface 419, the social networking application 122 can present an additional graphical user interface elements that ensures the users wants to stop the "live sharing" mode. The additional graphical user interface elements can describe "You are about to stop Live Sharing. Please confirm you're ready to stop sharing with your trusted contacts." The additional graphical user interface elements can include a button labeled "Stop Live Sharing" and another button labeled "Cancel." The user can select the former button labeled "Stop Live Sharing" to confirm the user desires to stop the "live sharing" mode. Similarly, the user can select the latter button labeled "Cancel" to continue with the "live sharing" mode. If the user selects the latter button labeled "Cancel", then the application 123 can transition the user interface 419 to user interface 418 to continue with the "live sharing" mode.

However, if the user selects the former button labeled "Stop Live Sharing" to confirm the user desires to stop the "live sharing" mode, then the social networking application 122 can transition the user interface 419 to user interface 420. User interface 420 is similar to user interface 418, but includes an additional graphical user interface elements. The additional graphical user interface elements request to understand why the user has decided to cease the "live sharing" mode. For example, the additional graphical user interface elements can include descriptions that read "Why did you stop Live Sharing? Tell your trusted contacts why you've stopped sharing, so they know you're OK." The additional graphical user interface elements can include different description.

Moreover, the additional graphical user interface elements can include one or more buttons that enable the user to indicate why they decided to stop the "live sharing" mode. For example, as illustrated in user interface 420, the user can select the first button "My date has ended safely" or the second button "Still on the date, but feeling safe." The user may decide to select the first button in the event that the user has, for example, left the in-person meetup, returned home, or moved to another location without the other person. In response to selecting the first button on the user interface 420, the social networking application 122 can send a notification to the server 104 describing that the user has ended the "live sharing" mode and indicate that the in-person meetup has ended. The safe monitoring engine 146 can receive this notification and transmit a message to each of the trusted contacts of the user, the message describing that the user has ended the "live sharing" mode because the in-person meetup has ended. Similarly, the safe monitoring engine 146 can cease providing status updates and location tracking of the user, e.g., such as those shown in user interface 417, in response to the user requesting to cease the "live sharing" mode.

Similarly, the user may decide to select the second button "Still on the date, but feeling safe" in the event that user no longer wishes to be in the "live sharing" mode. In response to selecting the second button on the user interface 420, the social networking application 122 can send a notification to the server 104 describing that the user has ended the "live sharing" mode and to indicate that the user is still on the in-person meetup. The safe monitoring engine 146 can receive this notification and transmit a message to each of the trusted contacts of the user, the message describing that the user has ended the "live sharing" mode because the user feels safe on the in-person meetup and no longer wishes to be tracked. Similarly, the safe monitoring engine 146 can cease providing status updates and location tracking of the user, e.g., such as those shown in user interface 417, in response to the user requesting to cease the "live sharing" mode.

In some implementations, the techniques discussed can be applied to each of the users that use the social networking application 122. Similarly, when two users associated with the social networking application 122 plan to perform an in-person meetup, the safe monitoring engine 146 can monitor the user's location and notify trusted contacts of statuses and location histories for each of the users. In this manner, the safe monitoring engine 146 of the server 104 can monitor the movement, status, and safety of each user that utilizes the social networking application 122. The safe monitoring engine 146 can make use of one or more computers or different servers for performing this task for each of its users as this may be a processing intensive task. With the help of different computers and different servers, the processing is relieved than what would be typically accomplished by a single computer or single server. However, a single computer or server sufficiently powerful enough to perform these processes can manage the tasks of safely monitoring each of the users of the social networking application.

Embodiments of the invention and all of the functional operations described in this specification may be implemented in digital electronic circuitry, or in computer software, firmware, or hardware, including the structures disclosed in this specification and their structural equivalents, or in combinations of one or more of them. Embodiments of the invention may be implemented as one or more computer program products, i.e., one or more modules of computer program instructions encoded on a computer-readable medium for execution by, or to control the operation of, data processing apparatus. The computer readable medium may be a non-transitory computer readable storage medium, a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments of the invention may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments of the invention may be implemented in a computing system that includes a back end component, e.g., as a data server, or that includes a middleware component, e.g., an application server, or that includes a front end component, e.g., a client computer having a graphical user interface or a Web browser through which a user may interact with an implementation of the invention, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, while a client application is described as accessing the delegate(s), in other implementations the delegate(s) may be employed by other applications implemented by one or more processors, such as an application executing on one or more servers. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
  receiving, by a server and from a client device associated with a first user, a request to activate a live sharing feature associated with the first user, the live sharing feature enabling access to a location and a status of the first user of a social networking application;
  obtaining, by the server and from the client device, data identifying a set of one or more trusted users to be designated as trusted contacts for the first user;
  determining, by the server, that an in-person engagement of the first user with a second user associated with the social networking application has initiated;
  in response to determining that the in-person engagement of the first user with the second user has initiated, transmitting, by the server and to a client device of each trusted user of the set of trusted users, (i) data indicating that the first user has initiated the in-person engagement with the second user and (ii) location data of the first user, wherein the transmitting comprises providing, by the server and to the client device of each trusted user of the set of trusted users, a group chat communication session enabling each trusted user to communicate with one another during a time period of the in-person engagement;
  obtaining, by the server and from the client device of the first user, data indicating a status of the first user's in-person engagement with the second user during the time period of the in-person engagement; and
  providing, by the server and to the client device of each trusted user of the set of trusted users, (i) the obtained data indicating the status of the first user's in-person engagement with the second user during the time period of the in-person engagement and (ii) the location data of the first user.

2. The computer-implemented method of claim 1, wherein receiving the request to activate the live sharing feature associated with the first user comprises:
  receiving, by the server and from the client device, the request to activate the live sharing feature, the request comprising data indicating the first user, data indicating a user profile of the first user, and data indicating the first user has requested to activate the living sharing feature;
  retrieving, by the server, the user profile of the first user from a plurality of user profiles associated with the social networking application; and
  storing, by the server and in the retrieved user profile associated with the first user, the data indicating the first user requested to activate the live sharing feature.

3. The computer-implemented method of claim 1, wherein obtaining the data identifying the set of trusted users to be designated as the trusted contacts for the first user comprises:
  providing, by the server and to the client device, data indicating one or more users for the first user to designate as trusted contacts for the first user; and
  receiving, by the server and from the client device, data indicating a selection of a subset of trusted users of the one or more users to be designated as a trusted contact for the first user.

4. The computer-implemented method of claim 3, wherein providing the data indicating the one or more users for the first user to designate as the trusted contacts while using the social networking application further comprises providing, by the server and to the client device, data for the client device to provide contact information from a list of contacts in a user interface to the first user for review, the user interface enabling the first user to select the subset of trusted users from users listed in the list of contacts.

5. The computer-implemented method of claim 1, in response to receiving the data indicating the selection of the set of trusted users as the trusted contact for the first user further, the method comprises:
  retrieving, by the server, a user profile of the first user from a plurality of user profiles associated with the social networking application; and
  storing, by the server and in the retrieved user profile associated with the first user, the data indicating the selection of the set of trusted users to be designated as the trusted contact for the first user, wherein the data comprises (i) an indication of each trusted user and (ii) contact information for each of the trusted users.

6. The computer-implemented method of claim 5, further comprising:
  for each trusted user of the set of trusted users:
    transmitting, by the server and to a client device of the trusted user, a request to determine whether the user designated as a trusted user desires to be a trusted user;
    receiving, by the server and from the client device of the trusted user, a response that indicates whether the user designated as the trusted user desires to be the trusted user, the response comprising at least one of an opt-in and an opt-out; and
    storing, by the server and in the user profile of the first user, the response that indicates whether the user designed as the trusted user desires to be the trusted user.

7. The computer-implemented method of claim 1, wherein prior to determining that the in-person engagement of the first user with the second user on the social networking application has initiated, the method comprises:

receiving, by the server and from the client device associated with the first user, data indicating that the first user desires to connect with the second user on the social networking application;

identifying, by the server, contact information for a second client device on the social networking application, the second client device being associated with the second user;

transmitting, by the server and to the second client device of the second user, the data indicating that the first user desires to connect with the second user on the social networking application;

receiving, by the server and from the second client device, data indicating the second user accepts the first user's request to connect with the second user; and enabling, by the server, a communication channel on the social networking application between the first user and the second user.

8. The computer-implemented method of claim 1, wherein determining that the in-person engagement of the first user with the second user associated with the social networking application has initiated, the method comprises:

receiving, by the server and from the client device of the first user, data indicating that the first user and the second user plan to be within a threshold geographic distance of one another for the engagement;

receiving, by the server and from the client device of the first user, data indicating that the first user desires to share their location with each trusted user of the set of trusted users;

determining, by the server, a first location of the client device associated with the first user and a second location of a second client device associated with the second user;

determining, by the server, a distance between the first location and the second location; and in response to determining the distance satisfies the threshold geographic distance, determining, by the server, the engagement of the first user with the second user associated with the social networking application has initiated.

9. The computer-implemented method of claim 1, wherein transmitting (i) the data indicating that the first user has initiated the in-person engagement with the second user and (ii) the location data of the first user further comprises:

obtaining, by the server, contact information for each of the trusted users from a user profile of the first user;

obtaining, by the server and in a periodic manner, location data of the client device of the first user; and transmitting, by the server and to each client device of the trusted users, (i) the data indicating that the first user has initiated the in-person engagement with the second user and (ii) the location data of the first user, using the obtained contacted information for each of the trusted users.

10. The computer-implemented method of claim 1, wherein obtaining the data indicating the status of the first user's in-person engagement with the second user during the time period of the in-person engagement further comprises:

while the time period of the in-person engagement has not elapsed:

determining, by the server, an amount of time has elapsed during the time period of the in-person engagement, wherein the amount of time is less than the time period of the in-person engagement;

transmitting, by the server and to the client device of the first user, user interface data, the user interface data presenting a user interface that requests the first user to provide a status indicative of (i) a pleasant engagement with the second user or (ii) an unpleasant engagement with the second user; and restarting, by the server, a countdown of the amount of time.

11. The computer-implemented method of claim 10, wherein providing (i) the obtained updates during the time period of the in-person engagement and (ii) the location data of the first user further comprises:

while the time period of the in-person engagement has not elapsed:

receiving, by the server and from the client device of the first user, the status indicative of (i) the pleasant engagement with the second user or (ii) the unpleasant engagement with the second user; and transmitting, by the server and to the client device of each trusted user of the set of trusted users, the status indicative of (i) the pleasant engagement with the second user or (ii) the unpleasant engagement with the second user and (iii) the location data of the user.

12. The computer-implemented method of claim 11, wherein providing (i) the obtained updates during the time period of the in-person engagement and (ii) the location data of the first user further comprises:

generating, by the server, a user interface that displays a history of: (i) the status indicative of the pleasant engagement or the unpleasant engagement during the time period of the in-person engagement, (ii) the location data of the first user during the time period of the in-person engagement, and (iii) a map on the user interface illustrating the location data of the first user during the time period of the in-person engagement; and transmitting, by the server and to the client device of each trusted user of the set of trusted users, the user interface.

13. The computer-implemented method of claim 1, wherein providing (i) the obtained updates during the time period of the in-person engagement and (ii) the location data of the first user further comprises:

while the time period of the in-person engagement has not elapsed:

receiving, by the server and from the client device of the first user, a status indicating (i) the first user requests to deactivate the live sharing feature and (ii) an indication that the in-person engagement is still continuing and the first user feels safe; and transmitting, by the server and to the client device of each trusted user of the set of trusted users, the status indicating that the first user has requested to deactivate the live sharing feature of the in-person engagement.

14. The computer-implemented method of claim 1, wherein obtaining the data indicating the status of the first user's in-person engagement with the second user during the time period of the in-person engagement further comprises:

obtaining, by the server and from the client device, a request indicating that the first user requests for emergency services;

in response to obtaining the request indicating that the first user requests for the emergency services, transmitting, by the server, instructions to the first client device causing the first client device to record at least one of audio and video data; and transmitting, by the server and to the emergency services, data indicating the first user requests for the emergency services.

15. A system comprising:

a server and one or more storage devices storing instructions that are operable, when executed by the server, to cause the server to perform operations comprising:

receiving, by a server and from a client device associated with a first user, a request to activate a live sharing feature associated with the first user, the live sharing feature enabling access to a location and a status of the first user of a social networking application;

obtaining, by the server and from the client device, data identifying a set of one or more trusted users to be designated as trusted contacts for the first user;

determining, by the server, that an in-person engagement of the first user with a second user associated with the social networking application has initiated;

in response to determining that the in-person engagement of the first user with the second user has initiated, transmitting, by the server and to a client device of each trusted user of the set of trusted users, (i) data indicating that the first user has initiated the in-person engagement with the second user and (ii) location data of the first user, wherein the transmitting comprises providing, by the server and to the client device of each trusted user of the set of trusted users, a group chat communication session enabling each trusted user to communicate with one another during a time period of the in-person engagement;

obtaining, by the server and from the client device of the first user, data indicating a status of the first user's in-person engagement with the second user during a time period of the in-person engagement; and providing, by the server and to the client device of each trusted user of the set of trusted users, (i) the obtained data indicating the status of the first user's in-person engagement with the second user during the time period of the in-person engagement and (ii) the location data of the first user.

16. The system of claim 15, wherein receiving the request to activate the live sharing feature associated with the first user comprises:

receiving, by the server and from the client device, the request to activate the live sharing feature, the request comprising data indicating the first user, data indicating a user profile of the first user, and data indicating the first user has requested to activate the living sharing feature;

retrieving, by the server, the user profile of the first user from a plurality of user profiles associated with the social networking application; and storing, by the server and in the retrieved user profile associated with the first user, the data indicating the first user requested to activate the live sharing feature.

17. The system of claim 15, wherein obtaining the data identifying the set of trusted users to be designated as the trusted contacts for the first user comprises:

providing, by the server and to the client device, data indicating one or more users for the first user to designate as trusted contacts for the first user; and receiving, by the server and from the client device, data indicating a selection of a subset of trusted users of the one or more users to be designated as a trusted contact for the first user.

18. The system of claim 17, wherein providing the data indicating the one or more users for the first user to designate as the trusted contacts while using the social networking application further comprises providing, by the server and to the client device, data for the client device to provide contact information from a list of contacts in a user interface to the first user for review, the user interface enabling the first user to select the subset of trusted users from users listed in the list of contacts.

19. A non-transitory computer-readable medium storing software comprising instructions executable by one or more computers which, upon such execution, cause the one or more computers to perform operations comprising:

receiving, by a server and from a client device associated with a first user, a request to activate a live sharing feature associated with the first user, the live sharing feature enabling access to a location and a status of the first user of a social networking application;

obtaining, by the server and from the client device, data identifying a set of one or more trusted users to be designated as trusted contacts for the first user;

determining, by the server, that an in-person engagement of the first user with a second user associated with the social networking application has initiated;

in response to determining that the in-person engagement of the first user with the second user has initiated, transmitting, by the server and to a client device of each trusted user of the set of trusted users, (i) data indicating that the first user has initiated the in-person engagement with the second user and (ii) location data of the first user, wherein the transmitting comprises providing, by the server and to the client device of each trusted user of the set of trusted users, a group chat communication session enabling each trusted user to communicate with one another during a time period of the in-person engagement;

obtaining, by the server and from the client device of the first user, data indicating a status of the first user's in-person engagement with the second user during a time period of the in-person engagement; and providing, by the server and to the client device of each trusted user of the set of trusted users, (i) the obtained data indicating the status of the first user's in-person engagement with the second user during the time period of the in-person engagement and (ii) the location data of the first user.

* * * * *